United States Patent
Agarwal

(10) Patent No.: US 9,646,471 B2
(45) Date of Patent: May 9, 2017

(54) USER INTERFACE USING TACTILE OUTPUT

(71) Applicant: Apple Inc., Cupertino, CA (US)

(72) Inventor: Mrinal Agarwal, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/058,996

(22) Filed: Mar. 2, 2016

(65) Prior Publication Data

US 2017/0092085 A1    Mar. 30, 2017

Related U.S. Application Data

(60) Provisional application No. 62/235,500, filed on Sep. 30, 2015.

(51) Int. Cl.
| | |
|---|---|
| *G08B 5/22* | (2006.01) |
| *G08B 6/00* | (2006.01) |
| *G06F 3/01* | (2006.01) |
| *G06F 3/041* | (2006.01) |
| *H04W 4/02* | (2009.01) |

(52) U.S. Cl.
CPC ............. *G08B 6/00* (2013.01); *G06F 3/016* (2013.01); *G06F 3/041* (2013.01); *H04W 4/021* (2013.01)

(58) Field of Classification Search
CPC ........ G08B 6/00; G06F 3/106; G06F 3/03547
USPC .............. 340/539.13, 7.6, 4.12, 407.1, 407.2
See application file for complete search history.

(56) References Cited

U.S. PATENT DOCUMENTS

| | | | | |
|---|---|---|---|---|
| 2012/0286944 A1* | 11/2012 | Forutanpour | ....... | G06F 3/04847 340/407.1 |
| 2015/0041289 A1* | 2/2015 | Ely | ........................ | H01H 3/122 200/4 |

* cited by examiner

*Primary Examiner* — Toan N Pham
(74) *Attorney, Agent, or Firm* — Morrison & Foerster LLP

(57) ABSTRACT

The present disclosure generally relates to user interfaces using tactile output. At a device, determine a first position of the device relative to a point of reference. After determining the first position, output, via one or more tactile output devices, a first tactile output, where the first tactile output is generated based on a first value of a characteristic that is selected in accordance with the first position. After outputting the first tactile output, detect a change in position of the device to a second position relative to the point of reference. In response to detecting the change in the position of the device, output a second tactile output that is different from the first tactile output, where the second tactile output is generated based on a second value of the characteristic that is selected in accordance with the second position of the device relative to the point of reference.

60 Claims, 15 Drawing Sheets

TIME ⟶

USER INTERFACE USING TACTILE OUTPUT

CROSS-REFERENCE TO RELATED APPLICATIONS

This application claims the benefit of U.S. Provisional Application No. 62/235,500, filed Sep. 30, 2015, the content of which is incorporated by reference herein in its entirety.

FIELD

The present disclosure relates generally to computer user interfaces, and more specifically to techniques for providing tactile output at an electronic device.

BACKGROUND

Many modern electronic devices provide indications, notification, instructions, or other information using a visual display. This requires a user to look at the device to get the information, which may be inconvenient or even dangerous if the user is performing an activity such as driving or riding a bike. Displaying the information may also make the information available to other people in proximity to the user. In addition, activating the display consumes power, which for battery-operated devices, necessitates more frequent charging of the device.

BRIEF SUMMARY

The techniques described below provide electronic devices with faster, safer, more efficient, and more discreet methods and interfaces for providing information to a user. Such methods and interfaces use tactile output to convey information and may optionally complement or replace other methods for providing information, like visual display. Tactile outputs can be received without a user having to look at the device, and can be provided inconspicuously to only the user. Accordingly, such methods and interfaces reduce the cognitive burden on a user and produce a more efficient and private human-machine interface. Also, for battery-operated computing devices, such methods and interfaces conserve power and increase the time between battery charges compared to techniques that require activating a display.

In some embodiments, a method comprises, at an electronic device with one or more tactile output devices, one or more processors, and memory: determining a first position of the electronic device relative to a point of reference; after determining the first position of the electronic device relative to the point of reference, outputting, via the one or more tactile output devices, a first tactile output, where the first tactile output is generated based on a first value of a characteristic that is selected in accordance with the first position of the electronic device relative to the point of reference; after outputting the first tactile output, detecting a change in position of the electronic device to a second position relative to the point of reference; and in response to detecting the change in the position of the electronic device, outputting, via the one or more tactile output devices, a second tactile output that is different from the first tactile output, where the second tactile output is generated based on a second value of the characteristic that is selected in accordance with the second position of the electronic device relative to the point of reference.

In some embodiments, an electronic device comprises one or more processors; one or more tactile output devices; a memory; and one or more programs. The one or more programs are stored in the memory and configured to be executed by the one or more processors, the one or more programs including instructions for: determining a first position of the electronic device relative to a point of reference; after determining the first position of the electronic device relative to the point of reference, outputting, via the one or more tactile output devices, a first tactile output, where the first tactile output is generated based on a first value of a characteristic that is selected in accordance with the first position of the electronic device relative to the point of reference; after outputting the first tactile output, detecting a change in position of the electronic device to a second position relative to the point of reference; and in response to detecting the change in the position of the electronic device, outputting, via the one or more tactile output devices, a second tactile output that is different from the first tactile output, where the second tactile output is generated based on a second value of the characteristic that is selected in accordance with the second position of the electronic device relative to the point of reference.

In some embodiments, a non-transitory computer-readable storage medium stores one or more programs, where the one or more programs comprise instructions, which when executed by one or more processors of an electronic device with a display and one or more input devices, cause the device to: determine a first position of the electronic device relative to a point of reference; after determining the first position of the electronic device relative to the point of reference, output, via the one or more tactile output devices, a first tactile output, where the first tactile output is generated based on a first value of a characteristic that is selected in accordance with the first position of the electronic device relative to the point of reference; after outputting the first tactile output, detect a change in position of the electronic device to a second position relative to the point of reference; and in response to detecting the change in the position of the electronic device, output, via the one or more tactile output devices, a second tactile output that is different from the first tactile output, where the second tactile output is generated based on a second value of the characteristic that is selected in accordance with the second position of the electronic device relative to the point of reference.

In some embodiments, a transitory computer-readable storage medium stores one or more programs, where the one or more programs comprise instructions, which when executed by one or more processors of an electronic device with a display and one or more input devices, cause the device to: determine a first position of the electronic device relative to a point of reference; after determining the first position of the electronic device relative to the point of reference, output, via the one or more tactile output devices, a first tactile output, where the first tactile output is generated based on a first value of a characteristic that is selected in accordance with the first position of the electronic device relative to the point of reference; after outputting the first tactile output, detect a change in position of the electronic device to a second position relative to the point of reference; and in response to detecting the change in the position of the electronic device, output, via the one or more tactile output devices, a second tactile output that is different from the first tactile output, where the second tactile output is generated based on a second value of the characteristic that is selected in accordance with the second position of the electronic device relative to the point of reference.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, an electronic device comprises: one or more tactile output devices; means for determining a first position of the electronic device relative to a point of reference; means for, after determining the first position of the electronic device relative to the point of reference, outputting, via the one or more tactile output devices, a first tactile output, where the first tactile output is generated based on a first value of a characteristic that is selected in accordance with the first position of the electronic device relative to the point of reference; means for, after outputting the first tactile output, detecting a change in position of the electronic device to a second position relative to the point of reference; and means for, in response to detecting the change in the position of the electronic device, outputting, via the one or more tactile output devices, a second tactile output that is different from the first tactile output, where the second tactile output is generated based on a second value of the characteristic that is selected in accordance with the second position of the electronic device relative to the point of reference.

In some embodiments, an electronic device comprises: a memory unit; a tactile output unit; and a processing unit coupled to the memory unit and the tactile output unit. The processing unit is configured to: determine a first position of the electronic device relative to a point of reference; after determining the first position of the electronic device relative to the point of reference, enable output, via the tactile output unit, of a first tactile output, where the first tactile output is generated based on a first value of a characteristic that is selected in accordance with the first position of the electronic device relative to the point of reference; after outputting the first tactile output, detect a change in position of the electronic device to a second position relative to the point of reference; and in response to detecting the change in the position of the electronic device, enable output, via the tactile output unit, of a second tactile output that is different from the first tactile output, where the second tactile output is generated based on a second value of the characteristic that is selected in accordance with the second position of the electronic device relative to the point of reference.

Thus, devices are provided with faster, more efficient methods and interfaces for assisting navigation and providing notifications, thereby increasing the effectiveness, efficiency, and user satisfaction with such devices. Such methods and interfaces may complement or replace other methods for assisting navigation and providing notifications.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
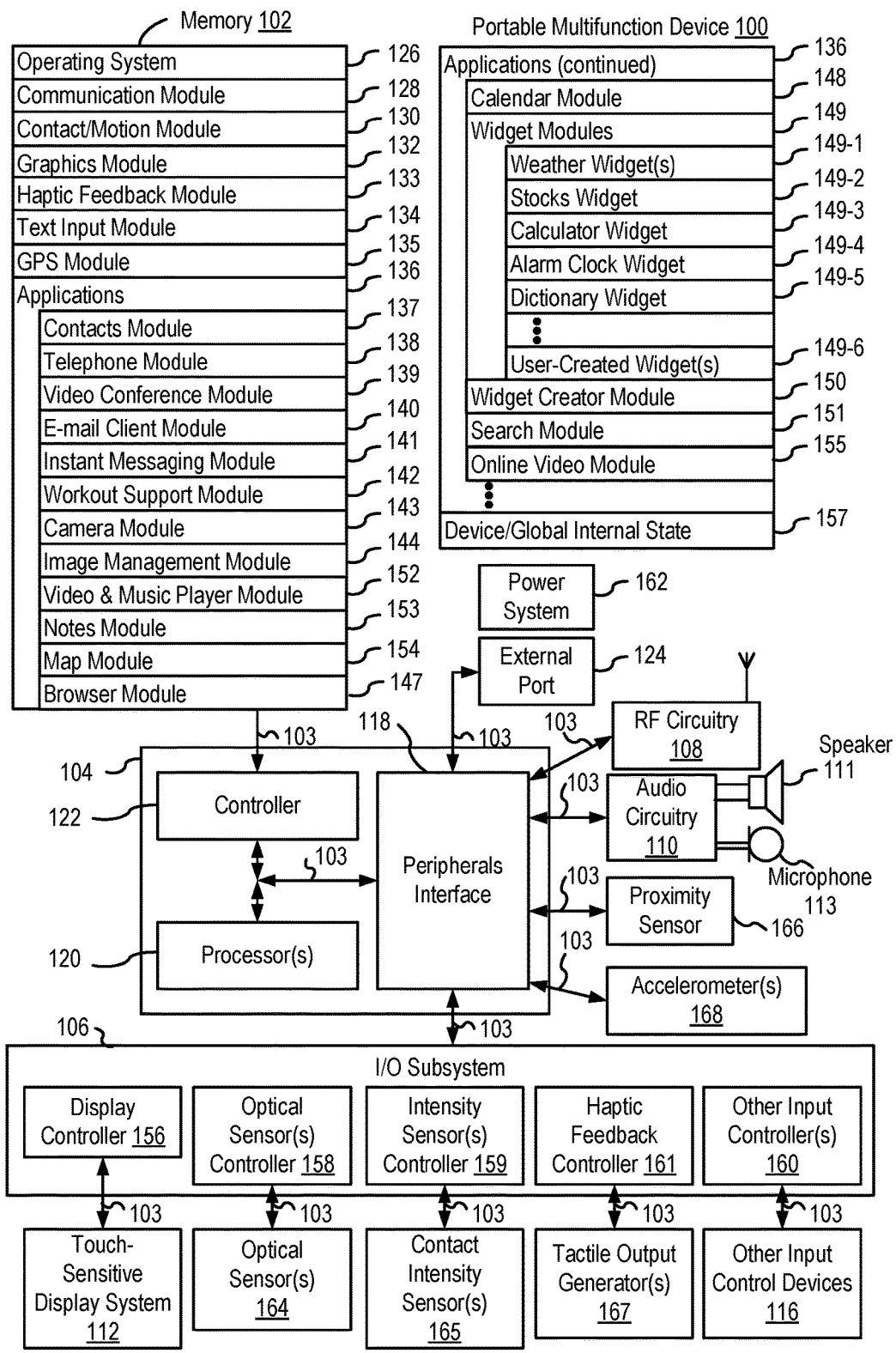
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for providing information such as, for example, notifications and/or navigation assistance, to a user. Tactile output can be used to provide various types of information. In some embodiments, for example, tactile output indicates the position of an electronic device relative to a point of reference or a change in the position of the electronic device relative to the point of reference. In this case, the tactile output can potentially assist the user in navigating to a desired location or alert the user to changes in the user's positional relationship to a point of interest. Tactile output can also be used to provide information related to a personal contact of a user, for example, by providing a notification that the contact is in the proximity of the user. Such techniques can reduce the cognitive burden on a user who accesses such information, thereby enhancing productivity. Further, such techniques can reduce processor and battery power otherwise wasted on activating a visual display.

Below, FIGS. 1A-1B, 2, 3, 4A-4B, 5A-5B, and 8 provide a description of exemplary devices for performing techniques for providing tactile output. FIGS. 6A-6J illustrate exemplary spatial relationships between an electronic device and one or more points of reference and exemplary tactile outputs. FIG. 7 is a flow diagram illustrating methods of providing tactile output in accordance with some embodiments. FIGS. 6A-6J are referred to in order to explain the embodiments described below, including the process in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator 167 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
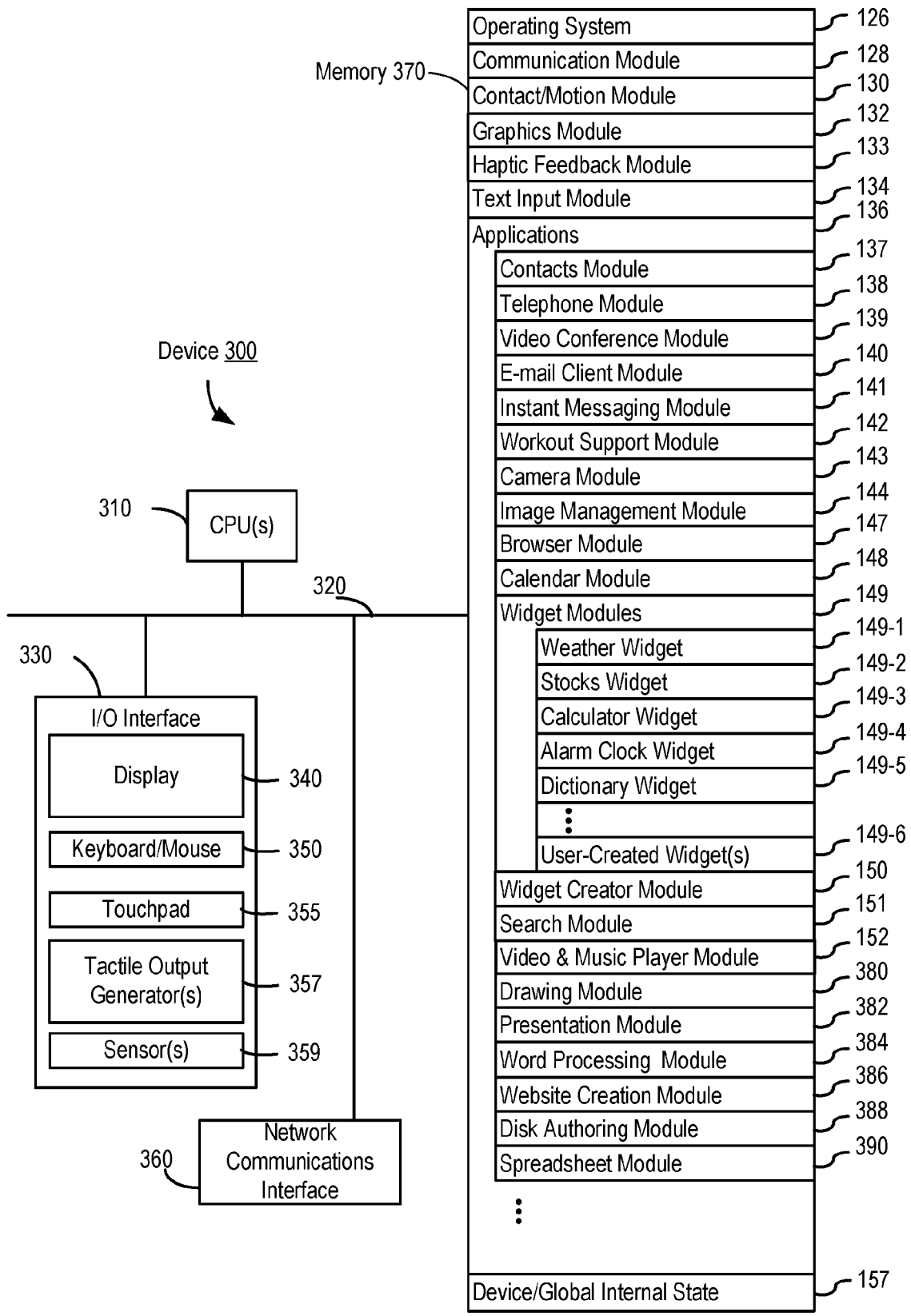
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100. In some embodiments, tactile outputs are produced in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
 Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;
 Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 Widget creator module 150 for making user-created widgets 149-6;
 Search module 151;
 Video and music player module 152, which merges video player module and music player module;
 Notes module 153;
 Map module 154; and/or
 Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
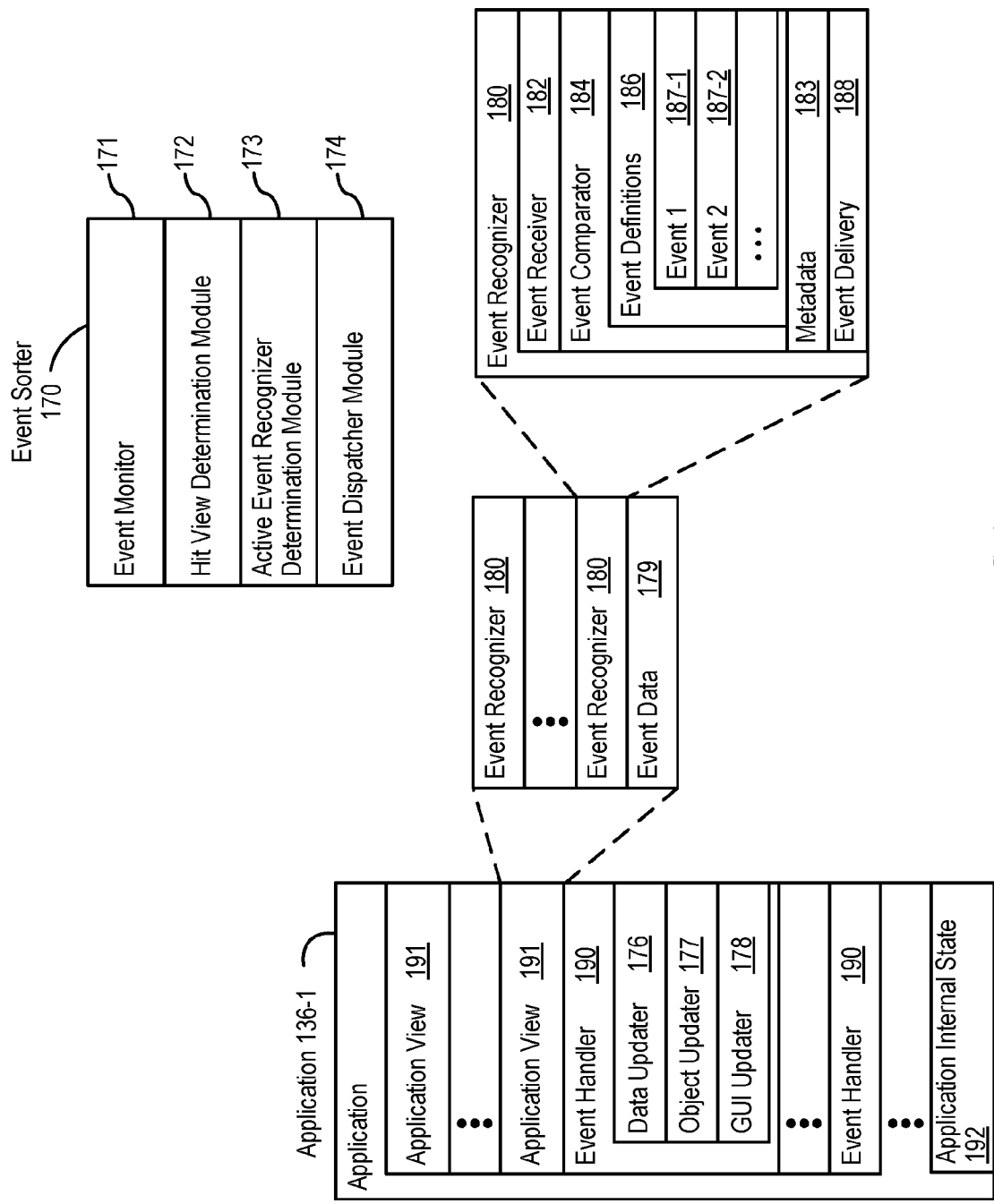
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
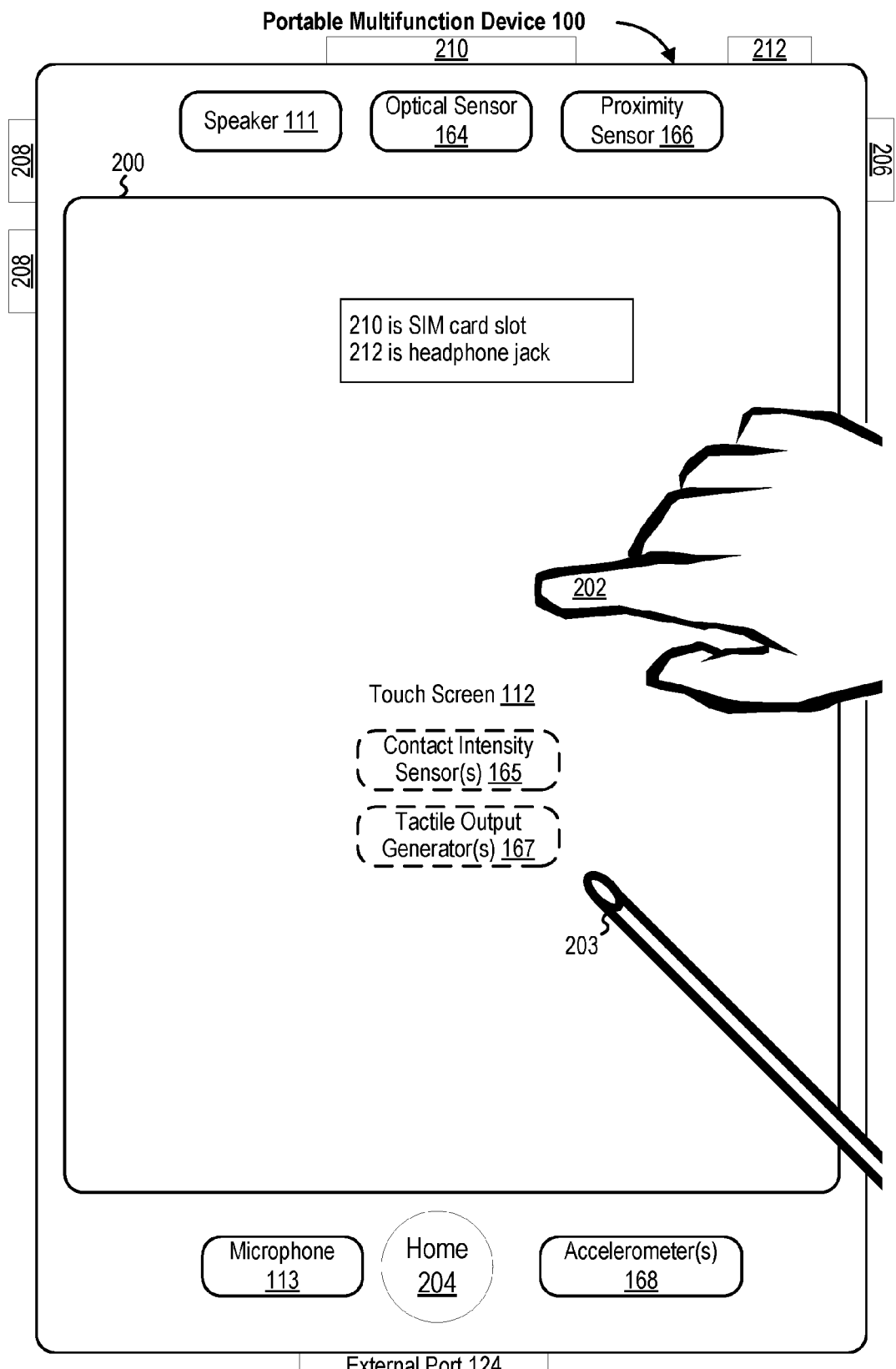
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
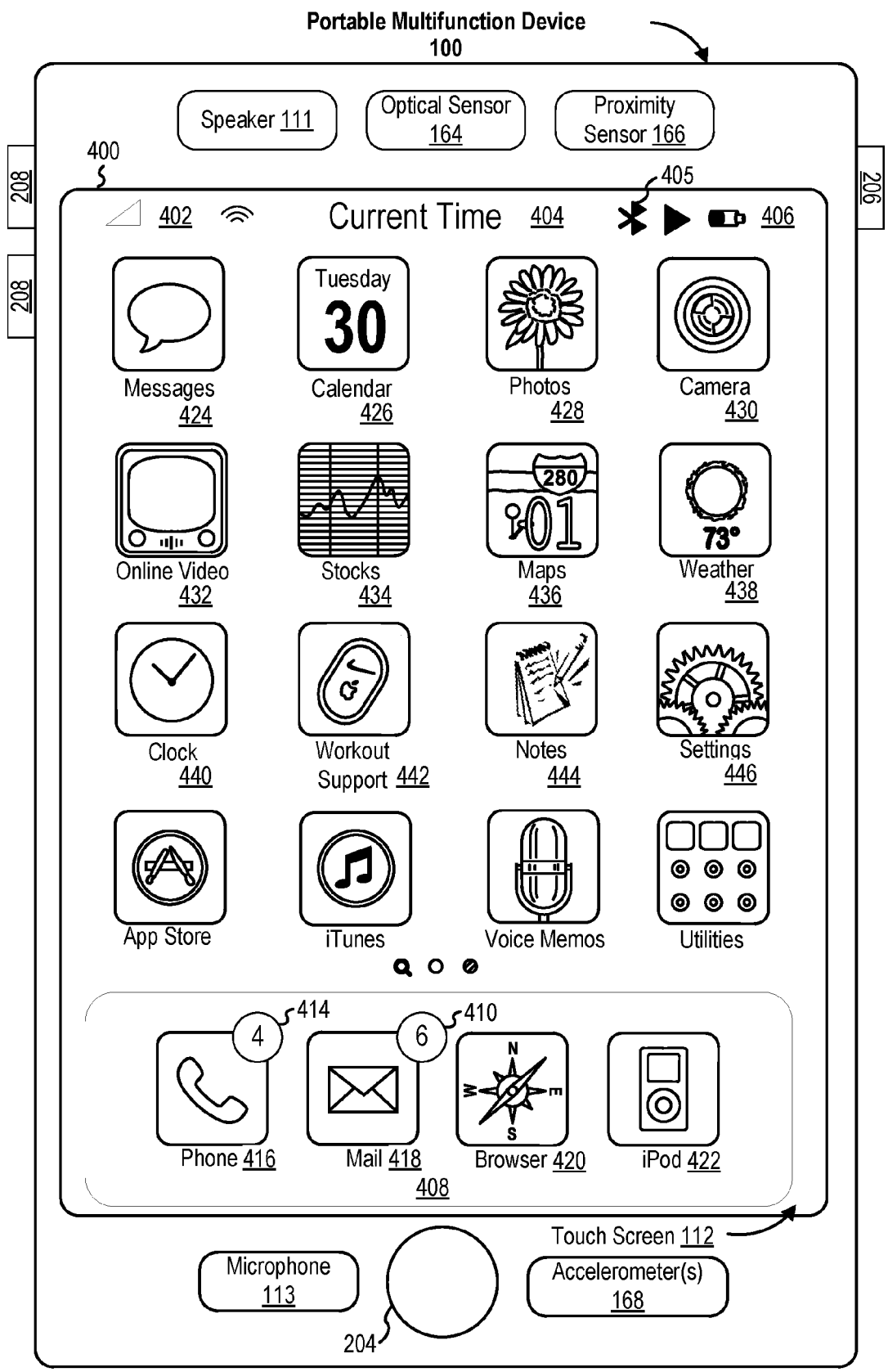
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
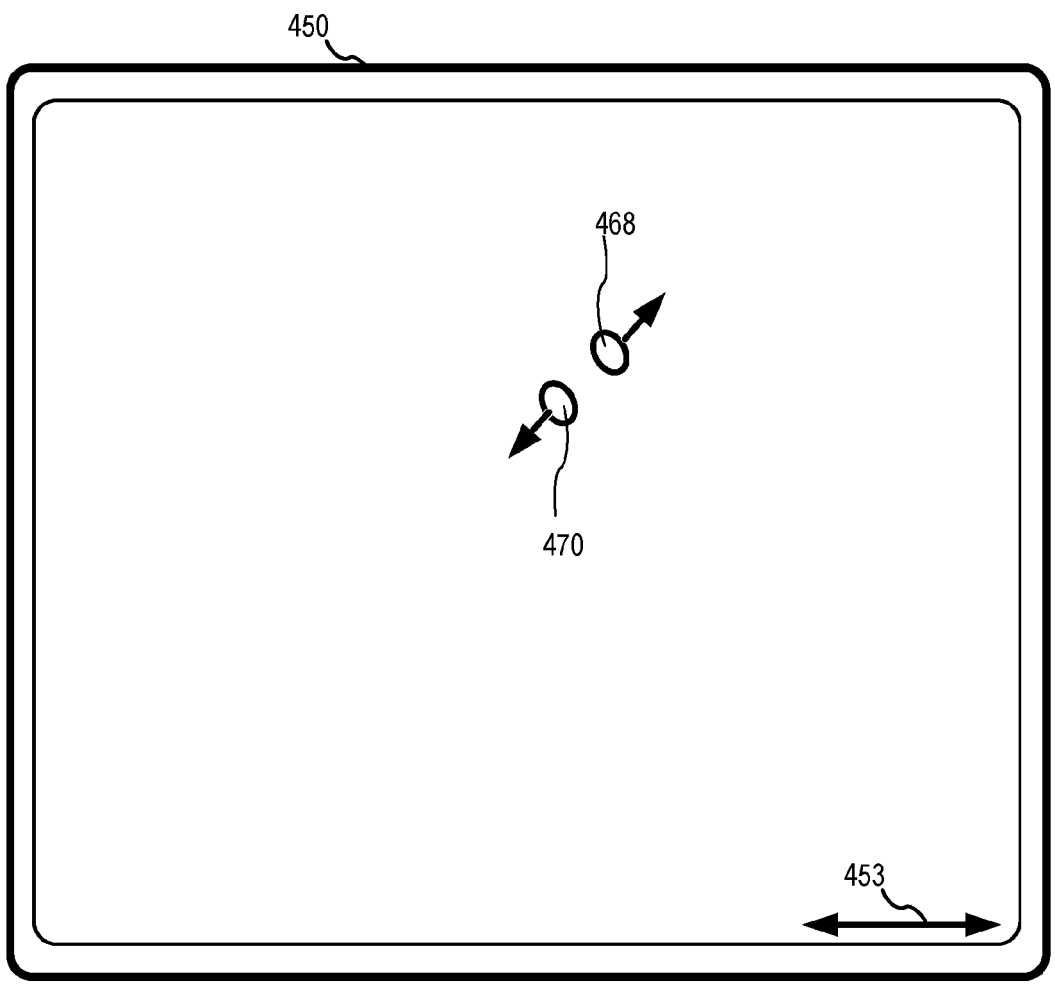
FIG. 4B illustrates an exemplary user interface for a multifunction device with a touch-sensitive surface that is separate from the display in accordance with some embodiments.
Figure 4B:
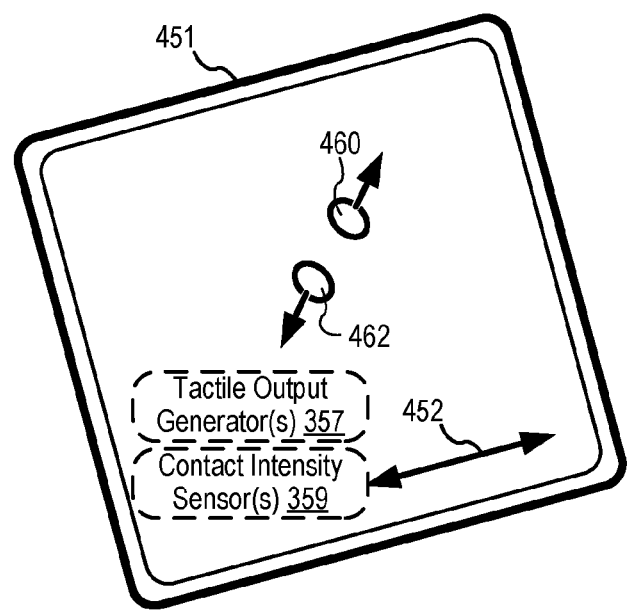

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
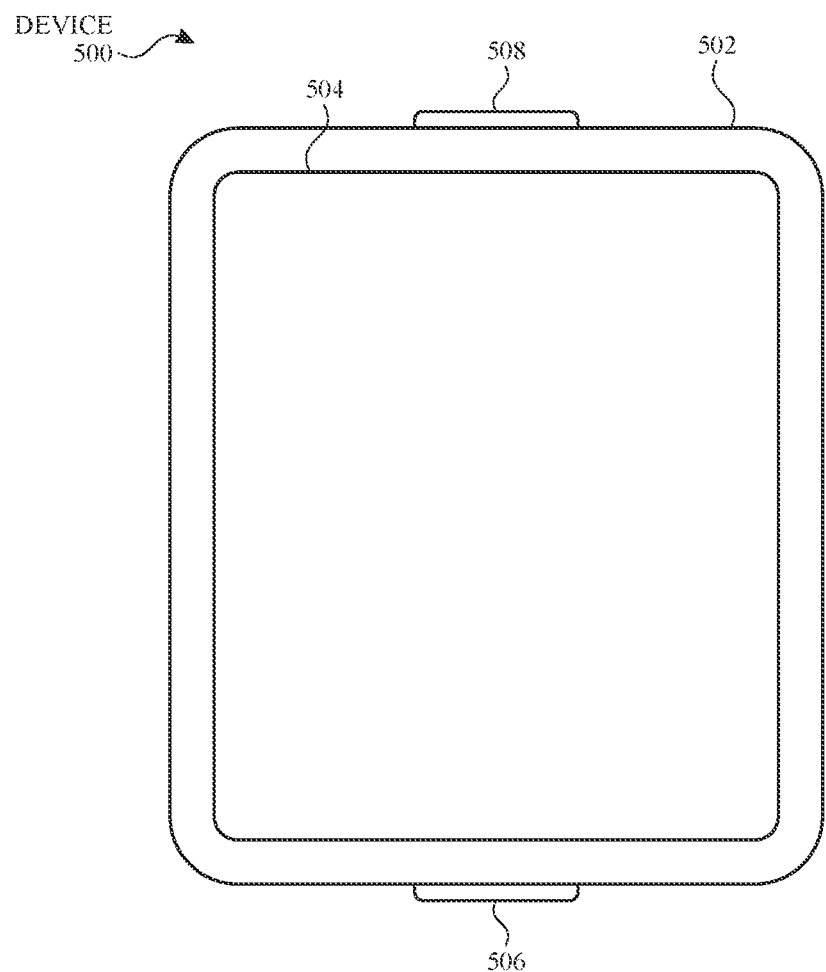
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
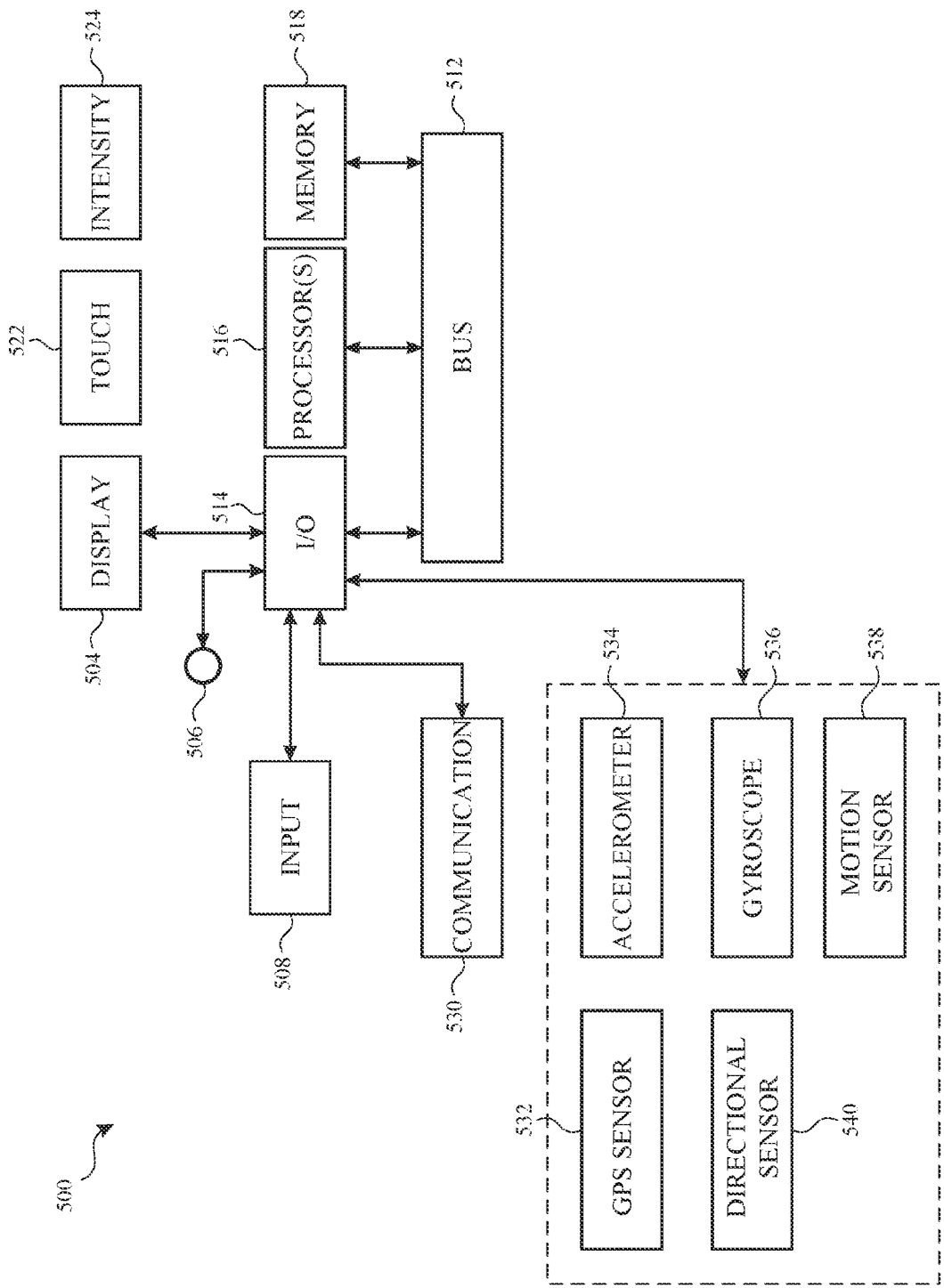
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described below, including processes 700 (FIG. 7). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of processes that are implemented on an electronic device, such as portable multifunction device 100, device 300, or device 500.

FIGS. 6A-6J illustrate exemplary spatial relationships between an electronic device and one or more points of reference, according to some embodiments; FIGS. 6A-6J also illustrate exemplary tactile outputs, in accordance with some embodiments. These figures are used to illustrate the processes described below, including the process in FIG. 7.

Figure 6A:
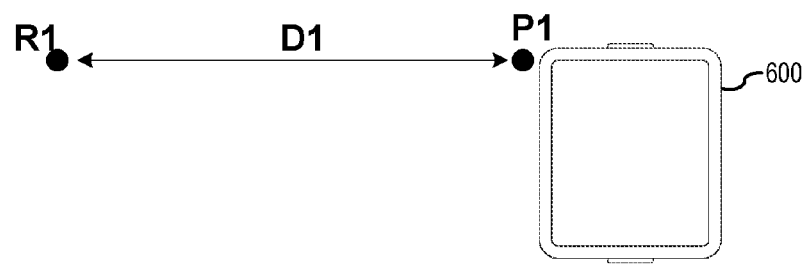
FIGS. 6A, 6C, 6F-6G, and 6I-6J illustrate exemplary spatial relationships between an electronic device and one or more points of reference in accordance with some embodiments.
Figure 7:
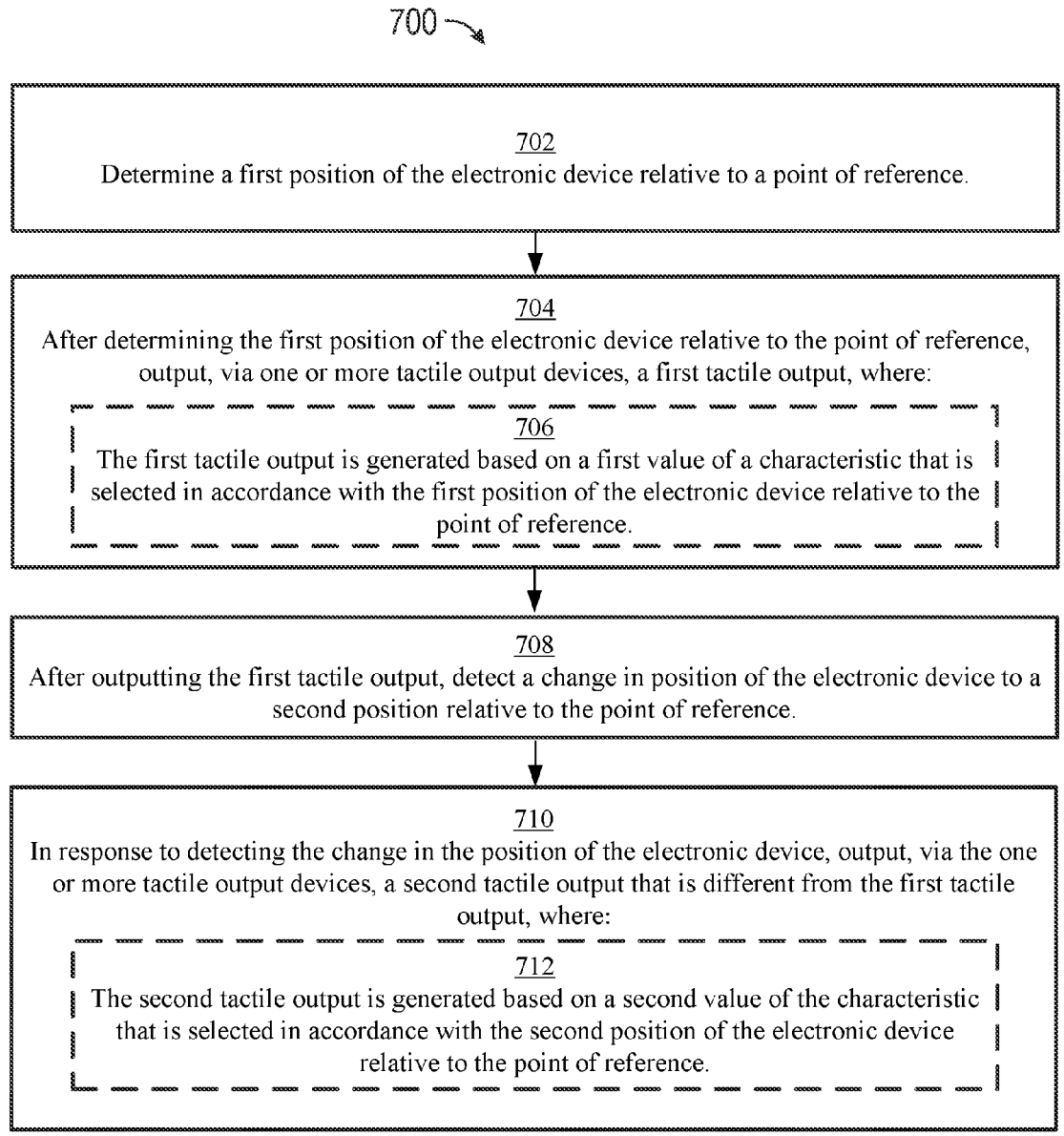
FIG. 7 is a flow diagram illustrating a method for providing tactile output using an electronic device in accordance with some embodiments.

FIG. 6A illustrates an electronic device 600 located at a first position P1 relative to a point of reference R. In some embodiments, device 600 is an electronic device, such as portable multifunction device 100, device 300, or device 500. Electronic device 600 includes one or more tactile output devices, such as tactile output generator 167, configured to produce tactile outputs.

In the example illustrated in FIG. 6A, device 600 is initially located at first position P1 a distance D1 away from point of reference R1. Electronic device 600 determines the first position P1 of electronic device 600 relative to point of reference R.

In some embodiments, the point of reference R1 is a fixed geographic (e.g., latitude/longitude) location. In some embodiments, the fixed geographic location is a physical location such as, for example, a point on a map such as a store, restaurant, etc. In some embodiments, the point of reference R1 is moveable.

In some embodiments, the point of reference R1 is the position of a remote electronic device such as, for example, a smartphone or mobile beacon. Optionally, electronic device 600 receives data about the position of the remote electronic device and determines the position of electronic device 600 relative to the remote electronic device based on the received data. In some embodiments, the electronic device 600 receives data about the position of the remote electronic device from the remote device itself or from another source (e.g., the Internet).

Figure 6B:
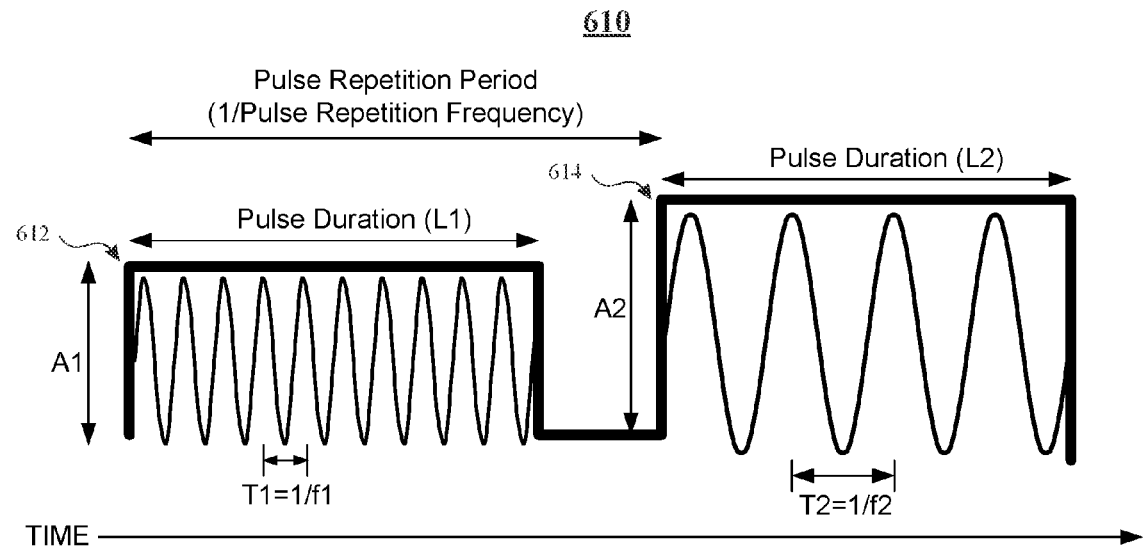
FIGS. 6B, 6D-6E, and 6H illustrate exemplary tactile outputs in accordance with some embodiments.

After determining the first position P1 of the electronic device 600 relative to the point of reference R1, device 600 outputs, via the one or more tactile output devices, a first tactile output. FIG. 6B depicts a representation over time of the magnitude of an exemplary tactile output 610 that illustrates various possible output characteristics. Exemplary characteristics of a tactile output, described in greater detail below, include oscillation frequency, pulse repetition frequency, pulse duration, pulse pattern, amplitude, and the number of pulses.

Tactile output 610 includes a first pulse 612 and a second pulse 614. In some embodiments, a tactile output includes one pulse or more than one pulse. Pulses 612 and 614 have pulse durations L1 and L2, respectively. In some embodiments, the pulse duration L1 of first pulse 612 is the same as the pulse duration L2 of second pulse 614. In some embodiments, the pulse duration L1 of first pulse 612 is different (e.g., longer or shorter) than the pulse duration L2 of second pulse 614.

Pulses 612 and 614 also have amplitudes A1 and A2, respectively. In some embodiments, the amplitude A1 of first pulse 612 is the same as the amplitude A2 of second pulse 614. In some embodiments, the amplitude A1 of first pulse 612 is different (e.g., greater or less) than the amplitude A2 of second pulse 614.

The time between the start of first pulse 612 and the start of second pulse 614 is referred to as the pulse repetition period. The inverse of the pulse repetition period is the pulse repetition frequency. In some embodiments, the pulse repetition period is the same from pulse to pulse. In some embodiments, the pulse repetition period changes from pulse to pulse. For example, in some embodiments of a tactile output with three pulses, the time between the start of the first pulse and the start of the second pulse is different than the time between the start of second pulse and the start of the third pulse.

Pulses 612 and 614 are also characterized by oscillation frequencies f1 and f2, respectively, defined by the inverse of the time between peaks in the oscillation (i.e. $f=1/T$). In some embodiments, the oscillation frequency f1 of first pulse 612 is the same as the oscillation frequency f2 of second pulse 614. In some embodiments, the oscillation frequency of first pulse 612 is different than the oscillation frequency of second pulse 614. In some embodiments, the oscillation frequency of a pulse is constant over the duration of the pulse. In some embodiments, the oscillation frequency varies (e.g., linearly up or down) over the duration of the pulse.

The pulse pattern of a tactile output can included any combination of the characteristics described above (e.g., the number of pulses, pulse duration, pulse repetition period, and/or oscillation frequency of a tactile output).

In some embodiments, the first tactile output is generated based on a first value of a characteristic, where the first value is selected in accordance with the first position P1 of the electronic device 600 relative to the point of reference R1. For example, in one embodiment, the first tactile output includes a plurality of pulses and the pulse repetition frequency of the output is selected in accordance with the distance D1 between the first position P1 and the point of reference R.

Figure 6C:
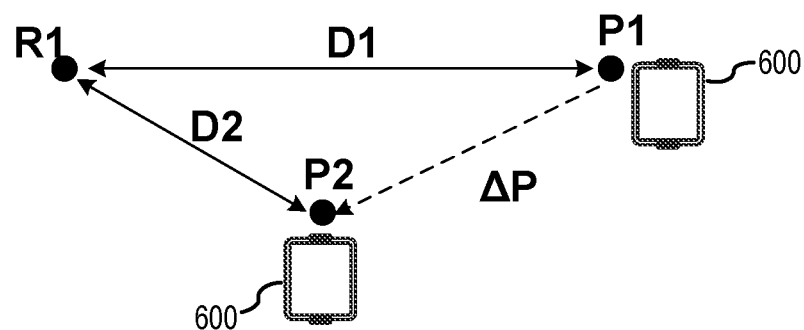

FIG. 6C illustrates movement of electronic device 600 from position P1 to position P2, which is a distance D2 away from point of reference R1. After outputting the first tactile output, electronic device 600 detects the change in position ΔP of electronic device 600 to second position P2 relative to a point of reference R1. In some embodiments, the change in position ΔP includes a change in the distance between the electronic device 600 and the point of reference R1, a change in the angular position relative to the point of reference R1, or both. In some embodiments, the change in position ΔP includes only a change in the distance between the electronic device 600 and the point of reference R1.

In response to detecting the change in position ΔP, electronic device 600 outputs, via the one or more tactile output devices, a second tactile output that is different from the first tactile output. In some embodiments, the second tactile output is generated based on a second value of the characteristic, where the second value is selected in accordance with the second position P2 of the electronic device 600 relative to the point of reference R1. For example, in one embodiment, the second tactile output includes a plurality of pulses and the pulse repetition frequency of the output is selected in accordance with the distance D2 between the second position P2 and the point of reference R1. In this way, electronic device 600 can provide an indication of its change in position.

Figure 6D:
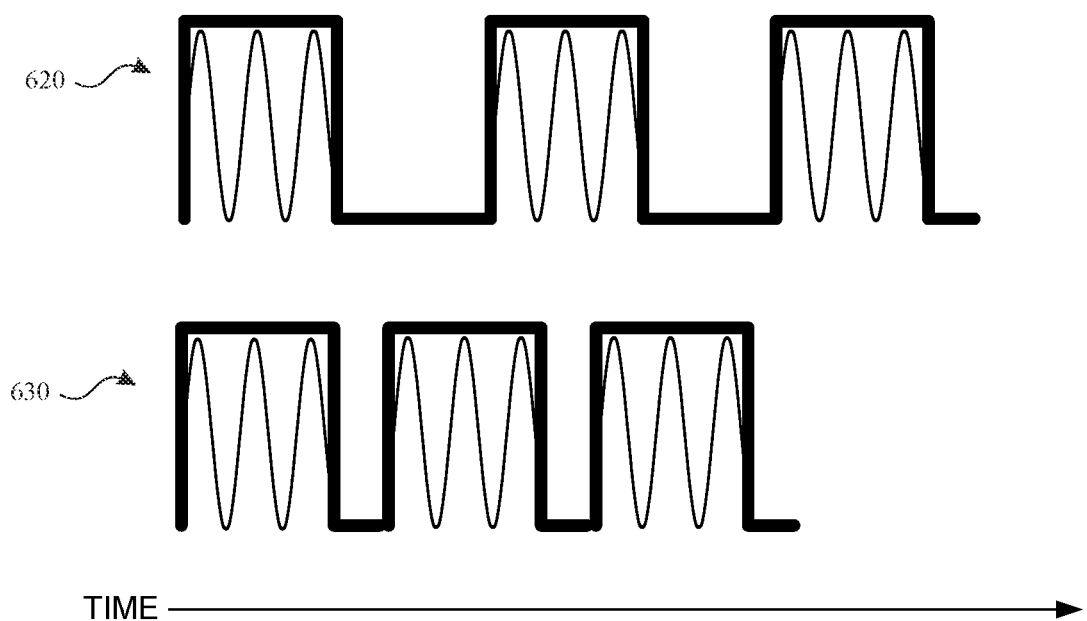

In some embodiments, the first value of the characteristic in the first tactile output is proportional to the distance D1 between the first position P1 of the electronic device 600 and the point of reference R1, and the second value of the characteristic in the second tactile output is proportional to the distance D2 between the second position P2 and the point of reference R1. For example, if the characteristic is the pulse repetition period, the time between pulses increases as the distance between the electronic device 600 and the point of reference R increases, and the time between pulses decreases as the distance decreases. FIG. 6D illustrates exemplary representations of a first tactile output 620 and a second tactile output 630 in which the values of the pulse repetition frequency of the first and second outputs are proportional to the distances D1 and D2, respectively. In the illustrated embodiment, the value of the pulse repetition period decreases from the first tactile output to the second tactile output as the distance to the point of reference R1 decreases from P1 to P2.

In some embodiments, the characteristic is the pulse repetition frequency, and, in accordance with a determination that the second position P2 of the electronic device 600 is closer to the point of reference R1 than the first position P1 of the electronic device 600, the value of the pulse repetition frequency of the second tactile output is selected to be greater than the value of the pulse repetition frequency of the first tactile output. Viewed another way, FIG. 6D also illustrates an example of this technique in which the pulse repetition frequency (i.e., the inverse of the pulse repetition period) increases as the electronic device 600 gets closer to the point of reference R1 such that the pulses get closer together in time, or stated another way, quicken in pace.

Figure 6E:
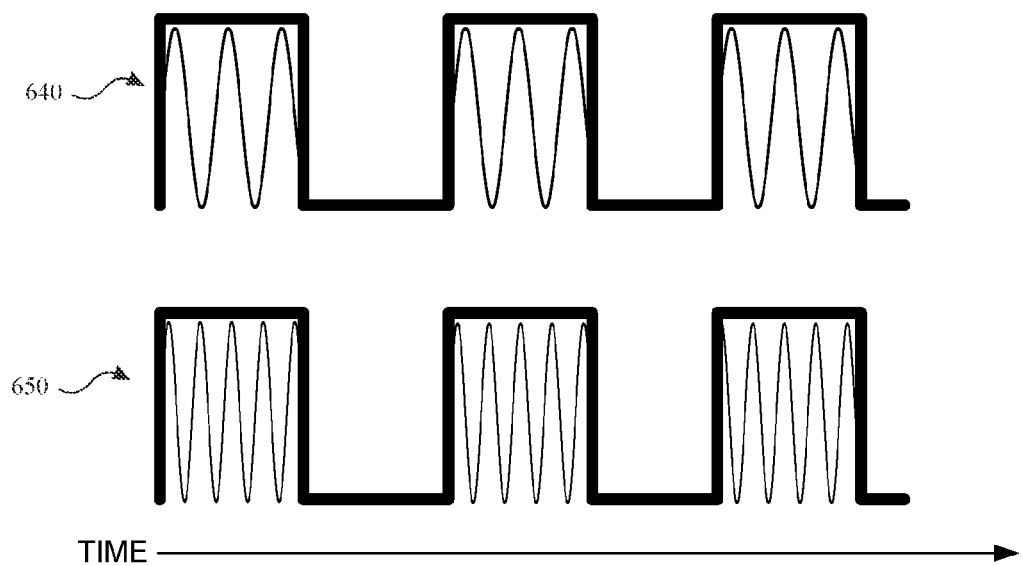

In some embodiments, the first value of the characteristic in the first tactile output is inversely proportional to the distance D1 between the first position P1 of the electronic device 600 and the point of reference R1, and the second value of the characteristic in the second tactile output is inversely proportional to the distance D2 between the second position P2 of the electronic device 600 and the point of reference R1. For example, if the characteristic is the pulse repetition period, the pulse repetition period increases as the distance between the electronic device 600 and the point of reference R1 decreases and decreases as the distance between the electronic device 600 and the point of reference R1 increases. As another example, FIG. 6E illustrates exemplary representations of a first tactile output 640 and a second tactile output 650 in which the values of the oscillation frequency of the pulses in the first and second outputs are inversely proportional to the distances D1 and D2, respectively. In the illustrated embodiment, the value of the oscillation frequency is smaller (lower frequency) when electronic device 600 is farther away from the point of reference R1 (e.g., at position P1) and larger (higher frequency) when electronic device 600 is closer to the point of reference R1 (e.g., at position P2). Accordingly, the oscillation frequency increases from the first tactile output 640 to the second tactile output 650 as the distance to the point of reference R decreases from P1 to P2.

In some embodiments, electronic device 600 determines the difference ΔP between the first position P1 of the electronic device 600 relative to the point of reference R and the second position P2 of the electronic device 600 relative to the point of reference R1. The second value of the characteristic in the second tactile output is then selected in accordance with the difference ΔP. In this case, a large increase/decrease in the distance of the electronic device 600 to the point of reference R1 causes a large increase/decrease in the value of the characteristic from the first tactile output to the second tactile output, whereas a smaller increase/decrease in the distance of the electronic device 600 to the point of reference R1 causes a smaller increase/decrease in the value of the characteristic.

The techniques described above have the potentially advantageous effect of providing a discreet indication of the user's position relative to the point of reference R1 without the user having to look at the electronic device 600. They also have the potentially advantageous effect of indicating to the user whether the distance between the electronic device 600 and the point of reference R1 is increasing or decreasing. This can assist the user in navigating to a desired location, again, without the user having to look away from his or her current activity. Moreover, the techniques potentially reduce battery usage, by not requiring activation of a display screen of the electronic device.

In some embodiments, in accordance with a determination that the change in position ΔP of the electronic device 600 is less than a predetermined threshold, the first value of the characteristic and the second value of the characteristic are the same. In such embodiments, the tactile output does not change from the first output to the second output unless a minimum change in position occurs. In some embodiments, the change in position threshold is one meter. In some embodiments, the change in position threshold is ten meters. This has the potentially advantageous effect of not disturbing the user with notifications of relatively small changes in position of which the user would not expect to be notified. It also can prevent changes in the tactile output due to noise or errors in the measurement or estimation of the position of the electronic device 600 and/or the point of reference R1.

Figure 6F:
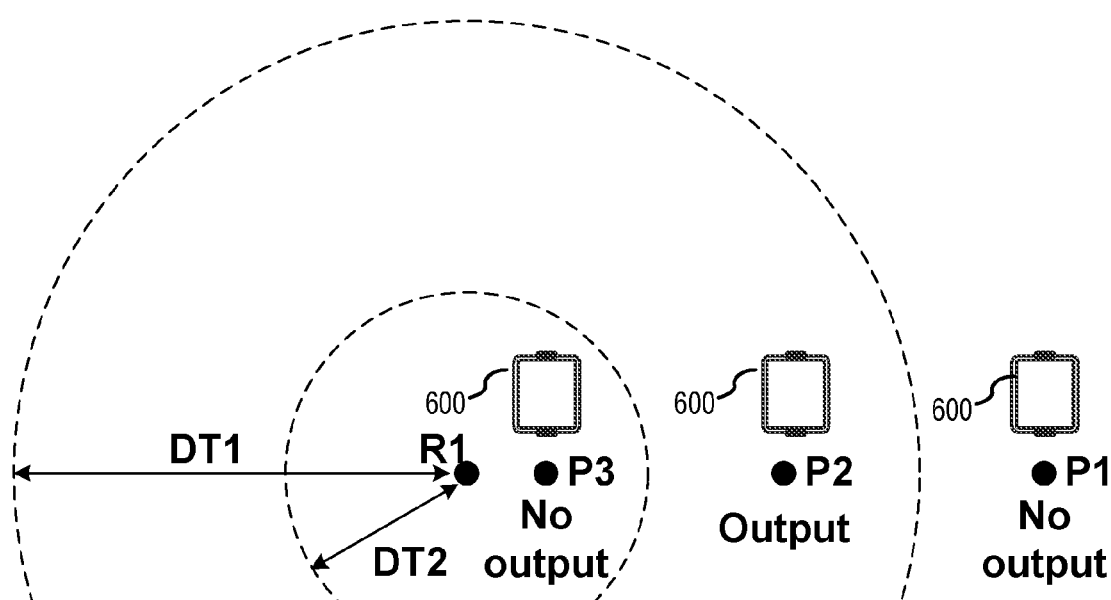

Optionally, electronic device 600 outputs tactile output only if certain criteria is met. FIG. 6F illustrates first threshold distance value DT1 and second threshold distance value DT2 used in some embodiments to determine whether electronic device 600 outputs tactile output, as described in greater detail below.

In some embodiments, the electronic device 600 outputs the first tactile output in accordance with a determination that a set of start criteria is met. In some embodiments, the set of start criteria includes a criterion that is met when the distance between the electronic device 600 and the point of reference R1 is less than the first threshold distance value DT1. This has the potentially advantageous effect of indicating to a user that the electronic device 600 is within a certain distance of a desired destination.

Optionally, while outputting the first tactile output, electronic device 600 determines whether the current position of the electronic device 600 relative to the point of reference R1 meets a set of stop criteria. In some embodiments, the set of stop criteria includes a criterion that is met when the current distance between the electronic device 600 and the point of reference R1 is less than the second threshold distance value DT2, where the second threshold distance value DT2 is less than the first threshold distance value DT1, as in FIG. 6F. In accordance with a determination that the current position of the electronic device 600 relative to the point of reference R meets the set of stop criteria, electronic device 600 ceases to output the first tactile output. In an example of this embodiment, FIG. 6F indicates that there is no output when electronic device 600 is at position P1 beyond first threshold DT1 and at position P3 inside of second threshold DT2. That is, tactile output is output if the distance between the electronic device 600 and the point of reference R1 is between outer threshold distance DT1 and inner threshold distance DT2. This has the potentially advantageous effect that tactile output will stop once electronic device 600 arrives at, or gets within a minimum distance of, a desired destination so as not to continually disturb the user.

Figure 6G:
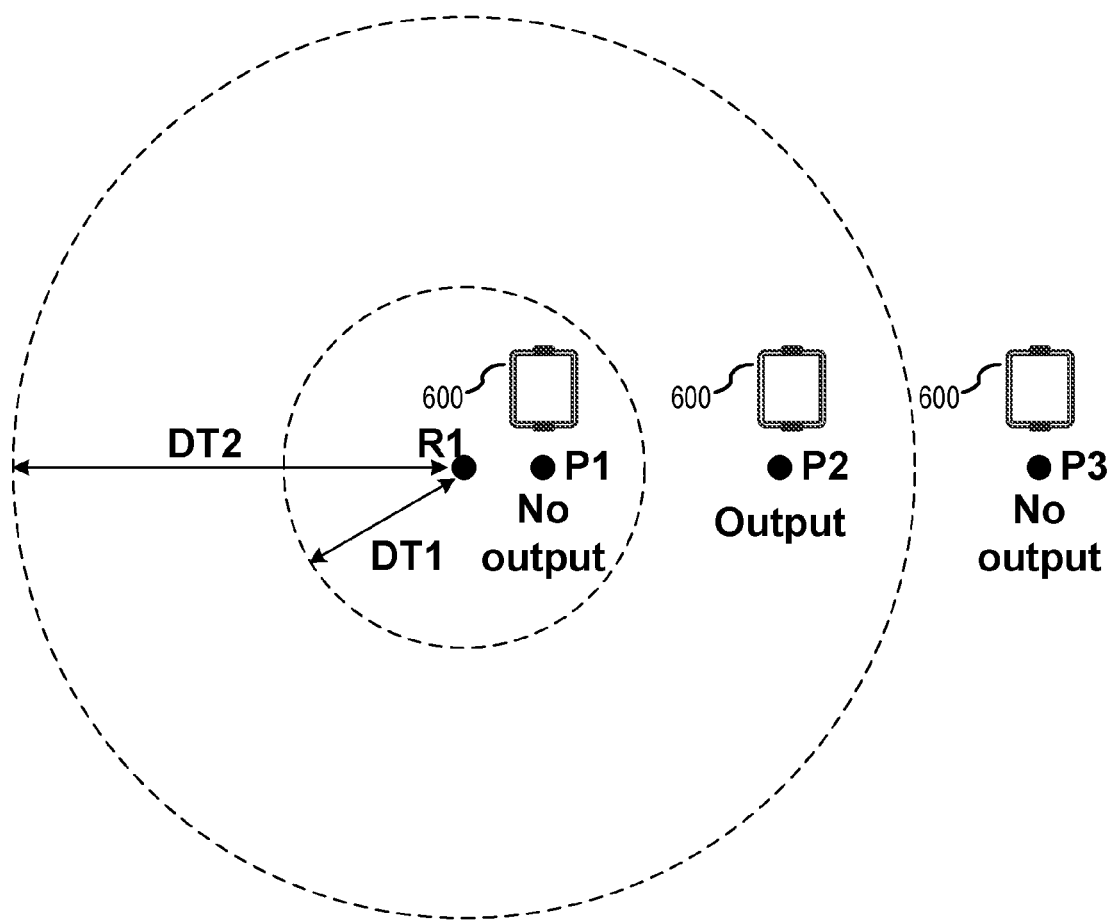

FIG. 6G illustrates an alternative embodiment in which the first threshold distance DT1 is less than the second threshold distance DT2. In some embodiments, the set of start criteria includes a criterion that is met when the distance between the electronic device 600 and the point of reference R1 is greater than the first threshold distance value DT1. This has the potentially advantageous effect of indicating to a user that the electronic device 600 has become too far away from the point of reference R1 (e.g., if a device used by a child strays too far from a device used by a parent).

In some instances of these embodiments, while outputting the first tactile output, the electronic device 600 determines whether the current position of the electronic device 600 relative to the point of reference R1 meets a set of stop criteria, where the set of stop criteria includes a criterion that is met when the current distance between the electronic device 600 and the point of reference R1 is greater than second threshold distance value DT2. In accordance with a determination that the current position of the electronic device 600 relative to the point of reference R1 meets the set of stop criteria, electronic device 600 ceases to output the first tactile output. According to these instances, tactile output is provided only while the electronic device 600 is within the second threshold distance DT2 from the point of reference R1. FIG. 6F illustrates one example and indicates that there is no output when electronic device 600 is at position P1 within first threshold DT1 and at position P3 outside of second threshold DT2. That is, tactile output is output if the distance between the electronic device 600 and the point of reference R1 is between inner threshold distance DT1 and outer threshold distance DT2. This has the potentially advantageous effect of stopping tactile output once the electronic device 600 gets too far away from the point of reference R1 (e.g., when the distance between the electronic device 600 and the point of reference R1 is so large that the positional relationship between them is no longer relevant).

Optionally, while outputting the first tactile output, electronic device 600 determines whether a second set of stop criteria is met. In some embodiments, the second set of stop criteria includes a criterion that is met when: (i) the difference between the current position of the electronic device 600 relative to the point of reference R1 and a previous position of the electronic device 600 relative to the point of reference R1 is less than a predetermined threshold, and (ii) the amount of time between a current time and a time associated with the previous position is greater than a predetermined amount of time. In accordance with a determination that the second set of stop criteria is met, electronic device 600 ceases to output the first tactile output. For example, returning to FIG. 6C, in some embodiments, the second set of stop criteria includes a criterion that is met when: (i) $\Delta P$ (i.e., the difference between the second position P2 of the electronic device 600 relative to the point of reference R1 and the first position P1 of the electronic device 600 relative to the point of reference R1) is less than a predetermined threshold, and (ii) the amount of time between the time at which the electronic device 600 is determined to be at position P2 and the time at which the electronic device 600 is determined to be at position P1 is greater than a predetermined amount of time. This provides the potentially advantageous advantage of suppressing tactile output if the position does not change or exceed the change-in-position threshold for a predetermined amount of time, so as not to disturb a user with continual output when there has been no meaningful change in position for a significant amount of time.

Figure 6H:
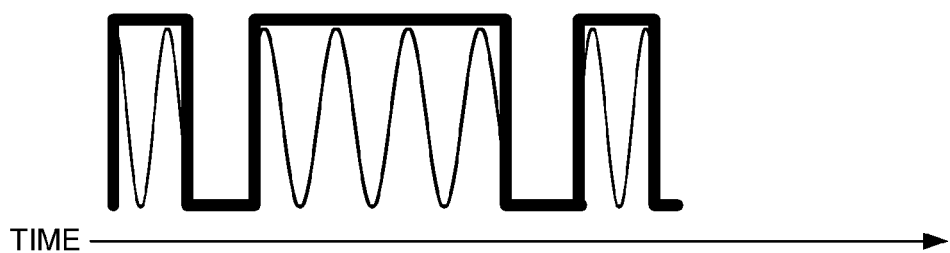

In some embodiments, the value of one or more characteristics of the tactile outputs provides an indication of a personal contact or group associated with the point of reference R1. In some embodiments, the first tactile output or the second tactile output is generated based on a value of a characteristic that is selected in accordance with the contact. In some embodiments, the value of the characteristic of the tactile output is specific to a contact or multiple contacts (e.g., a group of associated contacts). In some embodiments, the characteristic that indicates the identity of a contact is different than the characteristic that indicates the change in position. For example, in one embodiment, the pattern of pulses indicates the identity of a contact, while the pulse repetition frequency indicates the change in position. FIG. 6H illustrates two exemplary tactile outputs that identify two different contacts or groups.

Figure 6I:
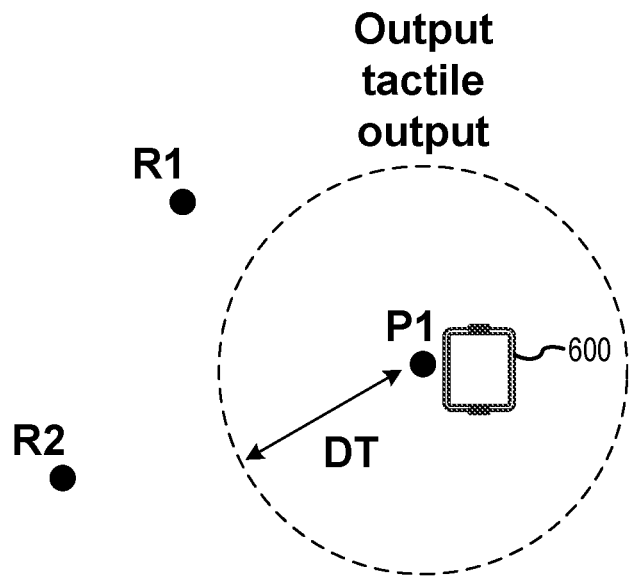
Figure 6J:
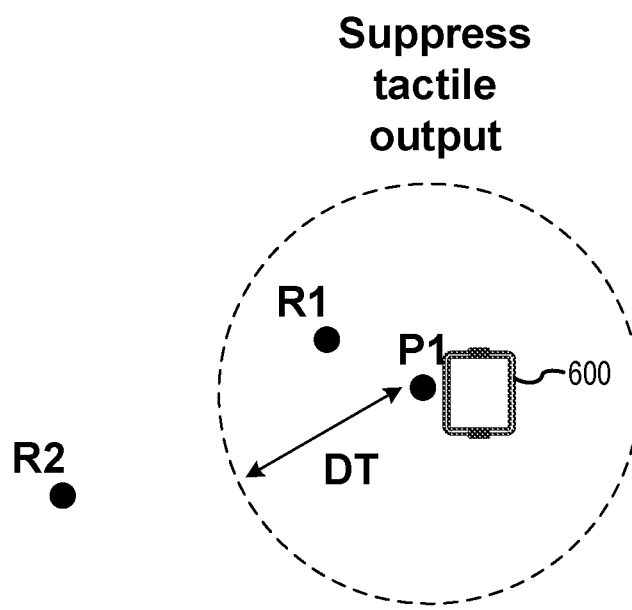

Optionally, tactile outputs corresponding to a point of reference associated with a contact in a group are output or suppressed based on the proximity of other contacts in the group. FIG. 6I illustrates electronic device 600 at position P1, a first point of reference R1, a second point of reference R2, and a threshold distance DT. In some embodiments, the first point of reference R1 is associated with a first contact in a group and the second point of reference R2 is associated with a second contact in the group. Optionally, electronic device 600 determines the position P1 of the electronic device 600 relative to the second point of reference R2 associated with the second contact. After determining the position of the electronic device 600 relative to the second point of reference R2, in accordance with a determination that the first point of reference R1 is greater than the threshold distance DT from the electronic device 600, electronic device 600 outputs, via the one or more tactile output devices, a tactile output. The tactile output is associated with the second point of reference R2 (and hence the second contact) and is generated based on a value of a characteristic that is selected in accordance with the group. Alternatively, in accordance with a determination that the first point of reference R1 is less than the threshold distance DT from the electronic device 600, the electronic device 600 suppresses the tactile output associated with the second contact (e.g., FIG. 6J). This technique has the potentially advantageous effect of suppressing the tactile output associated with a contact in a group if the electronic device 600 is already in the proximity of another member of the same group.

Optionally, indications associated with a member of a group are suppressed only after an initial indication has been provided. For example, in the embodiment described immediately above, the tactile output associated with the second contact is suppressed only if a tactile output associated with the second contact has been previously output. This has the potentially advantageous effect of notifying the user of electronic device 600 that the second contact is in proximity to the user without the risk of disturbing the user with further outputs.

In some embodiments, the tactile output associated with the second contact is output in accordance with a determination that the second point of reference R2 is less than a threshold distance from the electronic device 600 and a previous distance between the second point of reference R2 and the electronic device 600 was greater than the threshold distance. This has the potentially advantageous effect of notifying the user of the arrival of a group member by providing a tactile output to indicate that the second contact has come within a predetermined distance of the user.

In some embodiments, the tactile output associated with the second contact is output in accordance with a determination that the second point of reference R2 is greater than a threshold distance from the electronic device 600 and a previous distance between the second point of reference R2 and the electronic device 600 was less than the threshold distance. This has the potentially advantageous effect of notifying the user of the departure of a group member by providing a tactile output to indicate that a contact previously in proximity to the user has moved outside a predetermined distance of the user.

FIG. 7 is a flow diagram illustrating a method for providing tactile output using an electronic device in accordance with some embodiments. Method 700 is performed at an electronic device (e.g., 100, 300, 500, or 600) with one or more tactile output devices, one or more processors, and memory. Some operations in method 700 are, optionally, combined, the order of some operations are, optionally, changed, and some operations are, optionally, omitted.

As described below, method 700 provides an efficient, intuitive, and discreet way for providing information to a user through the use of tactile output. The method reduces the cognitive burden on a user for receiving information and, for example, navigating to a destination, thereby creating a more efficient human-machine interface. For battery-operated computing devices, providing a user interface that does not require a visual display conserves power and increases the time between battery charges.

At block 702, the electronic device (e.g., 600) determines a first position (e.g., P1) of the electronic device relative to a point of reference (e.g., R1). In some embodiments, the point of reference is a fixed geographic location. In some embodiments, the electronic device receives data about a position of a remote device, where the point of reference is the position of the remote device.

At block 704, after determining the first position of the electronic device relative to the point of reference, the electronic device outputs, via the one or more tactile output devices, a first tactile output (e.g., 620 in FIG. 6D). Optionally, at block 706, the first tactile output is generated based on a first value of a characteristic that is selected in accordance with the first position of the electronic device relative to the point of reference. In some embodiments, the characteristic is selected from the group consisting of oscillation frequency, pulse repetition frequency, pulse duration, pulse pattern, amplitude, and the number of pulses (e.g., FIG. 6B).

At block 708, after outputting the first tactile output, the electronic device detects a change in position (e.g., ΔP) of the electronic device to a second position (e.g., P2) relative to the point of reference.

At block 710, in response to detecting the change in the position of the electronic device, the electronic device outputs, via the one or more tactile output devices, a second tactile output (e.g., 630 in FIG. 6D) that is different from the first tactile output. Optionally, at block 712, the second tactile output is generated based on a second value of the characteristic that is selected in accordance with the second position of the electronic device relative to the point of reference.

In some embodiments, the first value of the characteristic is proportional to the distance between the first position of the electronic device and the point of reference, and the second value of the characteristic is proportional to the distance between the second position of the electronic device and the point of reference (e.g., pulse repetition period in FIG. 6D).

In some embodiments, the first value of the characteristic is inversely proportional to the distance between the first position of the electronic device and the point of reference, and the second value of the characteristic is inversely proportional to the distance between the second position of the electronic device and the point of reference (e.g., oscillation frequency in FIG. 6E).

Optionally, the electronic device determines a difference between the first position of the electronic device relative to the point of reference and the second position of the electronic device relative to the point of reference, where the second value of the characteristic is further selected in accordance with the difference between the first position of the electronic device relative to the point of reference and the second position of the electronic device relative to the point of reference.

In some embodiments, the characteristic is a pulse repetition frequency, and, in accordance with a determination that the second position of the electronic device is closer to the point of reference than the first position of the electronic device, the second value of the pulse repetition frequency of the second tactile output is selected to be greater than the first value of the pulse repetition frequency of the first tactile output (e.g., FIG. 6D).

In some embodiments, in accordance with a determination that the change in position of the electronic device is less than a predetermined threshold, the first value of the characteristic and the second value of the characteristic are the same.

Optionally, outputting the first tactile output is further in accordance with a determination that a set of start criteria is met. In some embodiments, the set of start criteria includes a criterion that is met when the distance between the electronic device and the point of reference (e.g., distance between P2 and R1 in FIG. 6F) is less than a first threshold distance value (e.g., DT1 in FIG. 6F). Optionally, while outputting the first tactile output, the electronic device determines whether a current position of the electronic device relative to the point of reference meets a set of stop criteria, where the set of stop criteria includes a criterion that is met when the current distance between the electronic device and the point of reference is less than a second threshold distance value (e.g., DT2 in FIG. 6F), and where the second threshold distance value is less than the first threshold distance value (e.g., FIG. 6F). In some embodiments, in accordance with a determination that the current position of the electronic device relative to the point of reference (e.g., P3 relative to R1 in FIG. 6F) meets the set of stop criteria, the electronic device ceases to output the first tactile output (e.g., FIG. 6F).

In some embodiments, the set of start criteria includes a criterion that is met when the distance between the electronic device and the point of reference (e.g., distance between P2 and R1 in FIG. 6G) is greater than a first threshold distance value (e.g., DT1 in FIG. 6G). Optionally, while outputting the first tactile output, the electronic device determines whether the current position of the electronic device relative to the point of reference meets a set of stop criteria, where the set of stop criteria includes a criterion that is met when the current distance between the electronic device and the point of reference is greater than a second threshold distance value (e.g., DT2 in FIG. 6G), and where the second threshold distance value is greater than the first threshold distance value (e.g., FIG. 6G). In some embodiments, in accordance with a determination that the current position of the electronic device relative to the point of reference (e.g., P3 relative to R1 in FIG. 6G) meets the set of stop criteria, the electronic device ceases to output the first tactile output (e.g., FIG. 6G).

Optionally, while outputting the first tactile output, the electronic device determines whether a second set of stop criteria is met, where the second set of stop criteria includes a criterion that is met when: (i) the difference between the current position relative to the point of reference and a previous position relative to the point of reference is less than a predetermined threshold, and (ii) the amount of time between a current time and a time associated with the previous position is greater than a predetermined amount of time. In some embodiments, in accordance with a determination that the second set of stop criteria is met, the electronic device ceases to output the first tactile output.

In some embodiments, the point of reference is associated with a contact, and the first tactile output or the second tactile output includes a second characteristic and is further generated based on a value of the second characteristic that is selected in accordance with the contact. In some embodiments, the point of reference is a first point of reference associated with a first contact in a group (e.g., R1 in FIG. 6I), and the electronic device determines a third position of the electronic device relative to a second point of reference associated with a second contact in the group (e.g., R2 in FIG. 6I). Optionally, after determining the third position of the electronic device relative to the second point of reference, the electronic device: (i) in accordance with a determination that the first point of reference (e.g., R1 in FIG. 6I) is greater than a first threshold distance from the electronic device (e.g., DT in FIG. 6I), outputs, via the one or more tactile output devices, a third tactile output, where the third tactile output is generated based on a value of a second characteristic that is selected in accordance with the group; and (ii) in accordance with a determination that the first point of reference (e.g., R1 in FIG. 6J) is less than the first threshold distance from the electronic device, suppresses the third tactile output. In some embodiments, the third tactile output is suppressed only if a tactile output associated with the second contact has been previously output.

In some embodiments, outputting the third tactile output is further in accordance with a determination that the second point of reference is less than a second threshold distance from the electronic device and a previous distance between the second point of reference and the electronic device was greater than the second threshold distance.

In some embodiments, outputting the third tactile output is further in accordance with a determination that the second point of reference is greater than a second threshold distance from the electronic device and a previous distance between the second point of reference and the electronic device was less than the second threshold distance.

Figure 8:
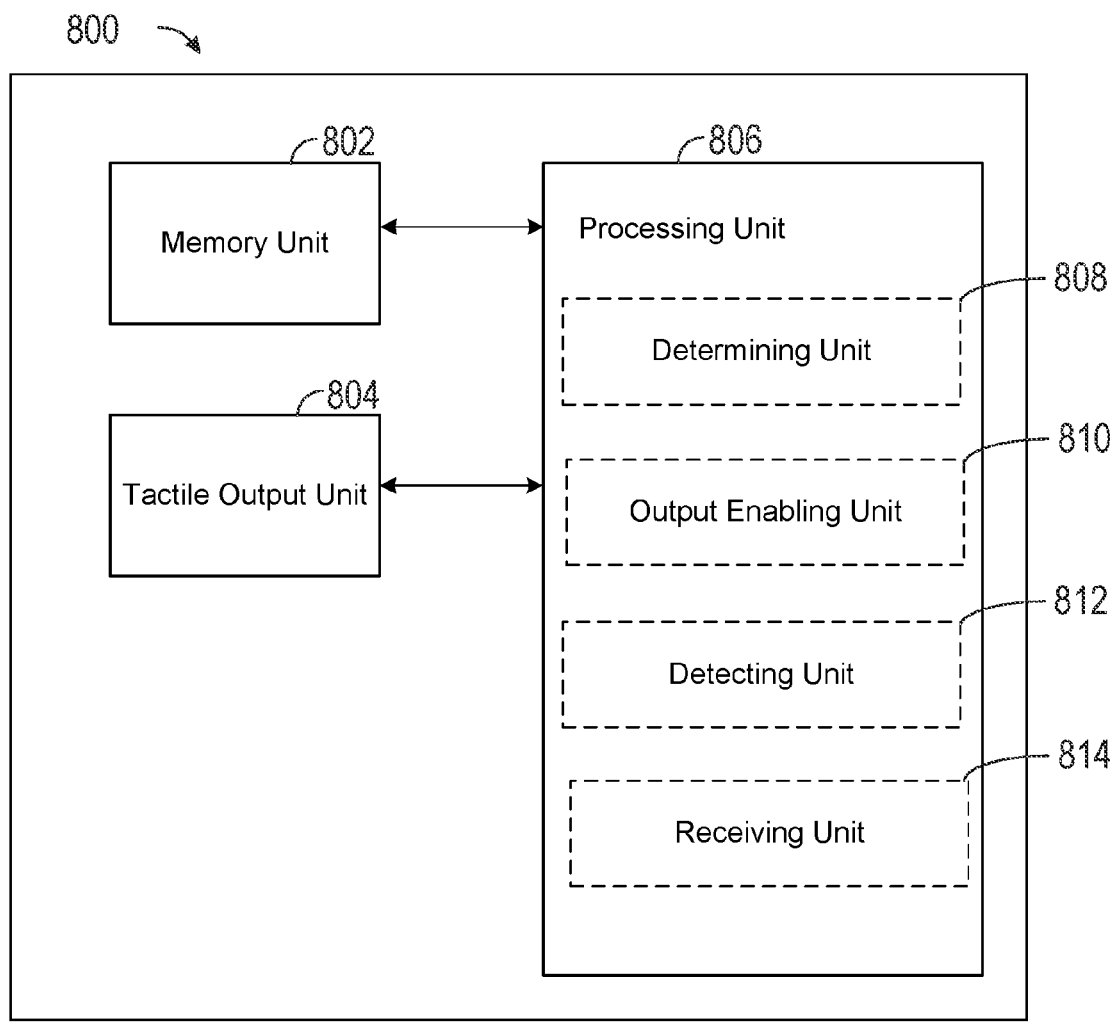
FIG. 8 is a block diagram of an exemplary electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a memory unit 802, a tactile output unit 804 configured to provide tactile output, and a processing unit 806 coupled to the memory unit 802 and the tactile output unit 804. In some embodiments, the processing unit 806 includes a determining unit 808, an output enabling unit 810, a detecting unit 812, and a receiving unit 814.

The processing unit 806 is configured to: determine (e.g., with determining unit 808) a first position of the electronic device relative to a point of reference; after determining the first position of the electronic device relative to the point of reference, enable output (e.g., with output enabling unit 810), via the tactile output unit 804, of a first tactile output, where the first tactile output is generated based on a first value of a characteristic that is selected in accordance with the first position of the electronic device relative to the point of reference; after outputting the first tactile output, detect (e.g., with detecting unit 812) a change in position of the electronic device to a second position relative to the point of reference; and in response to detecting the change in the position of the electronic device, enable output (e.g., with output enabling unit 810), via the tactile output unit 804, of a second tactile output that is different from the first tactile output, where the second tactile output is generated based on a second value of the characteristic that is selected in accordance with the second position of the electronic device relative to the point of reference.

In some embodiments, the first value of the characteristic is proportional to the distance between the first position of the electronic device and the point of reference, and the second value of the characteristic is proportional to the distance between the second position of the electronic device and the point of reference.

In some embodiments, the first value of the characteristic is inversely proportional to the distance between the first position of the electronic device and the point of reference, and the second value of the characteristic is inversely proportional to the distance between the second position of the electronic device and the point of reference.

In some embodiments, processing unit 806 is further configured to determine (e.g., with determining unit 808) a difference between the first position of the electronic device relative to the point of reference and the second position of the electronic device relative to the point of reference, where the second value of the characteristic is further selected in accordance with the difference between the first position of the electronic device relative to the point of reference and the second position of the electronic device relative to the point of reference.

In some embodiments, the characteristic is a pulse repetition frequency and, in accordance with a determination that the second position of the electronic device is closer to the point of reference than the first position of the electronic device, the second value of the pulse repetition frequency of the second tactile output is selected to be greater than the first value of the pulse repetition frequency of the first tactile output.

In some embodiments, in accordance with a determination that the change in position of the electronic device is less than a predetermined threshold, the first value of the characteristic and the second value of the characteristic are the same.

In some embodiments, the characteristic is selected from the group consisting of oscillation frequency, pulse repetition frequency, pulse duration, pulse pattern, amplitude, and the number of pulses.

In some embodiments, enabling output of the first tactile output is further in accordance with a determination that a set of start criteria is met.

In some embodiments, the set of start criteria includes a criterion that is met when the distance between the electronic device and the point of reference is less than a first threshold distance value.

In some embodiments, processing unit 806 is further configured to: while outputting the first tactile output, determine (e.g., with determining unit 808) whether a current position of the electronic device relative to the point of reference meets a set of stop criteria, where the set of stop criteria includes a criterion that is met when the current distance between the electronic device and the point of reference is less than a second threshold distance value, and where the second threshold distance value is less than the first threshold distance value; and in accordance with a determination that the current position of the electronic device relative to the point of reference meets the set of stop criteria, cause (e.g., with output enabling unit 810) the tactile output unit to cease output of the first tactile output.

In some embodiments, the set of start criteria includes a criterion that is met when the distance between the electronic device and the point of reference is greater than a first threshold distance value.

In some embodiments, processing unit 806 is further configured to: while outputting the first tactile output, determine (e.g., with determining unit 808) whether the current position of the electronic device relative to the point of reference meets a set of stop criteria, where the set of stop criteria includes a criterion that is met when the current distance between the electronic device and the point of reference is greater than a second threshold distance value, and where the second threshold distance value is greater than the first threshold distance value; and in accordance with a determination that the current position of the electronic device relative to the point of reference meets the set of stop criteria, cause (e.g., with output enabling unit 810) the tactile output unit to cease output of the first tactile output.

In some embodiments, processing unit 806 is further configured to: while outputting the first tactile output, determine (e.g., with determining unit 808) whether a second set of stop criteria is met, where the second set of stop criteria includes a criterion that is met when: (i) the difference between the current position relative to the point of reference and a previous position relative to the point of reference is less than a predetermined threshold, and (ii) the amount of time between a current time and a time associated with the previous position is greater than a predetermined amount of time; and in accordance with a determination that the second set of stop criteria is met, cause (e.g., with output enabling unit 810) the tactile output unit to cease output of the first tactile output.

In some embodiments, the point of reference is a fixed geographic location.

In some embodiments, processing unit 806 is further configured to receive (e.g., with receiving unit 814) data about a position of a remote device, where the point of reference is the position of the remote device.

In some embodiments, the point of reference is associated with a contact, and the first tactile output or the second tactile output includes a second characteristic and is further generated based on a value of the second characteristic that is selected in accordance with the contact.

In some embodiments, the point of reference is a first point of reference associated with a first contact in a group, and processing unit 806 is further configured to: determine (e.g., with determining unit 808) a third position of the electronic device relative to a second point of reference associated with a second contact in the group; and after determining the third position of the electronic device relative to the second point of reference: (i) in accordance with a determination that the first point of reference is greater than a first threshold distance from the electronic device, enable output (e.g., with output enabling unit 810), via the one or more tactile output devices, of a third tactile output, where the third tactile output is generated based on a value of a second characteristic that is selected in accordance with the group; and (ii) in accordance with a determination that the first point of reference is less than the first threshold distance from the electronic device, cause suppression of the third tactile output.

In some embodiments, the third tactile output is suppressed only if a tactile output associated with the second contact has been previously output.

In some embodiments, enabling output of the third tactile output is further in accordance with a determination that the second point of reference is less than a second threshold distance from the electronic device and a previous distance between the second point of reference and the electronic device was greater than the second threshold distance.

In some embodiments, enabling output of the third tactile output is further in accordance with a determination that the second point of reference is greater than a second threshold distance from the electronic device and a previous distance between the second point of reference and the electronic device was less than the second threshold distance.

The operations described above with reference to FIG. 7 are, optionally, implemented by components depicted in FIGS. 1A-1B or FIG. 8. For example, determining operation 702, outputting operations 704 and 710, and detecting operation 708 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A non-transitory computer-readable storage medium storing one or more programs, the one or more programs comprising instructions, which when executed by one or more processors of an electronic device with one or more tactile output devices, cause the electronic device to:
    determine a first position of the electronic device relative to a point of reference;
    after determining the first position of the electronic device relative to the point of reference, output, via the one or more tactile output devices, a first tactile output, wherein the first tactile output is generated based on a first value of a characteristic that is selected in accordance with the first position of the electronic device relative to the point of reference;
    after outputting the first tactile output, detect a change in position of the electronic device to a second position relative to the point of reference; and
    in response to detecting the change in the position of the electronic device, output, via the one or more tactile output devices, a second tactile output that is different from the first tactile output, wherein the second tactile output is generated based on a second value of the characteristic that is selected in accordance with the second position of the electronic device relative to the point of reference.

2. The non-transitory computer-readable storage medium of claim 1, wherein the first value of the characteristic is proportional to a distance between the first position of the electronic device and the point of reference, and the second value of the characteristic is proportional to a distance between the second position of the electronic device and the point of reference.

3. The non-transitory computer-readable storage medium of claim 1, wherein the first value of the characteristic is inversely proportional to a distance between the first position of the electronic device and the point of reference, and the second value of the characteristic is inversely proportional to a distance between the second position of the electronic device and the point of reference.

4. The non-transitory computer-readable storage medium of claim 1, wherein the one or more programs further comprise instructions, which when executed by the one or more processors, cause the electronic device to:
    determine a difference between the first position of the electronic device relative to the point of reference and the second position of the electronic device relative to the point of reference,
    wherein the second value of the characteristic is further selected in accordance with the difference between the first position of the electronic device relative to the point of reference and the second position of the electronic device relative to the point of reference.

5. The non-transitory computer-readable storage medium of claim 1,
    wherein the characteristic is a pulse repetition frequency, and
    wherein, in accordance with a determination that the second position of the electronic device is closer to the point of reference than the first position of the electronic device, the second value of the pulse repetition frequency of the second tactile output is selected to be greater than the first value of the pulse repetition frequency of the first tactile output.

6. The non-transitory computer-readable storage medium of claim 1, wherein, in accordance with a determination that the change in position of the electronic device is less than a predetermined threshold, the first value of the characteristic and the second value of the characteristic are the same.

7. The non-transitory computer-readable storage medium of claim 1, wherein the characteristic is selected from the group consisting of oscillation frequency, pulse repetition frequency, pulse duration, pulse pattern, amplitude, and a number of pulses.

8. The non-transitory computer-readable storage medium of claim 1, wherein outputting the first tactile output is further in accordance with a determination that a set of start criteria is met.

9. The non-transitory computer-readable storage medium of claim 8, wherein the set of start criteria includes a criterion that is met when the distance between the electronic device and the point of reference is less than a first threshold distance value.

10. The non-transitory computer-readable storage medium of claim 9, wherein the one or more programs further comprise instructions, which when executed by the one or more processors, cause the electronic device to:
while outputting the first tactile output, determine whether a current position of the electronic device relative to the point of reference meets a set of stop criteria, wherein the set of stop criteria includes a criterion that is met when the current distance between the electronic device and the point of reference is less than a second threshold distance value, wherein the second threshold distance value is less than the first threshold distance value; and
in accordance with a determination that the current position of the electronic device relative to the point of reference meets the set of stop criteria, cease to output the first tactile output.

11. The non-transitory computer-readable storage medium of claim 8, wherein the set of start criteria includes a criterion that is met when the distance between the electronic device and the point of reference is greater than a first threshold distance value.

12. The non-transitory computer-readable storage medium of claim 11, wherein the one or more programs further comprise instructions, which when executed by the one or more processors, cause the electronic device to:
while outputting the first tactile output, determine whether the current position of the electronic device relative to the point of reference meets a set of stop criteria, wherein the set of stop criteria includes a criterion that is met when the current distance between the electronic device and the point of reference is greater than a second threshold distance value, wherein the second threshold distance value is greater than the first threshold distance value; and
in accordance with a determination that the current position of the electronic device relative to the point of reference meets the set of stop criteria, cease to output the first tactile output.

13. The non-transitory computer-readable storage medium of claim 8, wherein the one or more programs further comprise instructions, which when executed by the one or more processors, cause the electronic device to:
while outputting the first tactile output, determine whether a second set of stop criteria is met, wherein the second set of stop criteria includes a criterion that is met when:
the difference between the current position relative to the point of reference and a previous position relative to the point of reference is less than a predetermined threshold, and
the amount of time between a current time and a time associated with the previous position is greater than a predetermined amount of time; and
in accordance with a determination that the second set of stop criteria is met, cease to output the first tactile output.

14. The non-transitory computer-readable storage medium of claim 1, wherein the point of reference is a fixed geographic location.

15. The non-transitory computer-readable storage medium of claim 1, wherein the one or more programs further comprise instructions, which when executed by the one or more processors, cause the electronic device to:
receive data about a position of a remote device, wherein the point of reference is the position of the remote device.

16. The non-transitory computer-readable storage medium of claim 15, wherein the point of reference is associated with a contact, and wherein the first tactile output or the second tactile output includes a second characteristic and is further generated based on a value of the second characteristic that is selected in accordance with the contact.

17. The non-transitory computer-readable storage medium of claim 15, wherein the point of reference is a first point of reference associated with a first contact in a group, and wherein the one or more programs further comprise instructions, which when executed by the one or more processors, cause the electronic device to:
determine a third position of the electronic device relative to a second point of reference associated with a second contact in the group; and
after determining the third position of the electronic device relative to the second point of reference:
in accordance with a determination that the first point of reference is greater than a first threshold distance from the electronic device, output, via the one or more tactile output devices, a third tactile output, wherein the third tactile output is generated based on a value of a second characteristic that is selected in accordance with the group; and
in accordance with a determination that the first point of reference is less than the first threshold distance from the electronic device, suppress the third tactile output.

18. The non-transitory computer-readable storage medium of claim 17, wherein the third tactile output is suppressed only if a tactile output associated with the second contact has been previously output.

19. The non-transitory computer-readable storage medium of claim 17, wherein outputting the third tactile output is further in accordance with a determination that the second point of reference is less than a second threshold distance from the electronic device and a previous distance between the second point of reference and the electronic device was greater than the second threshold distance.

20. The non-transitory computer-readable storage medium of claim 17, wherein outputting the third tactile output is further in accordance with a determination that the second point of reference is greater than a second threshold distance from the electronic device and a previous distance between the second point of reference and the electronic device was less than the second threshold distance.

21. A method, comprising:
at an electronic device with one or more tactile output devices, one or more processors, and memory:
determining a first position of the electronic device relative to a point of reference;
after determining the first position of the electronic device relative to the point of reference, outputting, via the one or more tactile output devices, a first tactile output, wherein the first tactile output is generated based on a first value of a characteristic that is selected in accordance with the first position of the electronic device relative to the point of reference;
after outputting the first tactile output, detecting a change in position of the electronic device to a second position relative to the point of reference; and
in response to detecting the change in the position of the electronic device, outputting, via the one or more tactile output devices, a second tactile output that is different from the first tactile output, wherein the second tactile output is generated based on a second value of the characteristic that is selected in accordance with the second position of the electronic device relative to the point of reference.

22. An electronic device, comprising:
one or more processors;
one or more tactile output devices;
a memory; and
one or more programs, wherein the one or more programs are stored in the memory and configured to be executed by the one or more processors, the one or more programs including instructions for:
  determining a first position of the electronic device relative to a point of reference;
  after determining the first position of the electronic device relative to the point of reference, outputting, via the one or more tactile output devices, a first tactile output, wherein the first tactile output is generated based on a first value of a characteristic that is selected in accordance with the first position of the electronic device relative to the point of reference;
  after outputting the first tactile output, detecting a change in position of the electronic device to a second position relative to the point of reference; and
  in response to detecting the change in the position of the electronic device, outputting, via the one or more tactile output devices, a second tactile output that is different from the first tactile output, wherein the second tactile output is generated based on a second value of the characteristic that is selected in accordance with the second position of the electronic device relative to the point of reference.

23. The method of claim 21, wherein the first value of the characteristic is proportional to a distance between the first position of the electronic device and the point of reference, and the second value of the characteristic is proportional to a distance between the second position of the electronic device and the point of reference.

24. The method of claim 21, wherein the first value of the characteristic is inversely proportional to a distance between the first position of the electronic device and the point of reference, and the second value of the characteristic is inversely proportional to a distance between the second position of the electronic device and the point of reference.

25. The method of claim 21, further comprising:
determining a difference between the first position of the electronic device relative to the point of reference and the second position of the electronic device relative to the point of reference,
wherein the second value of the characteristic is further selected in accordance with the difference between the first position of the electronic device relative to the point of reference and the second position of the electronic device relative to the point of reference.

26. The method of claim 21,
wherein the characteristic is a pulse repetition frequency, and
wherein, in accordance with a determination that the second position of the electronic device is closer to the point of reference than the first position of the electronic device, the second value of the pulse repetition frequency of the second tactile output is selected to be greater than the first value of the pulse repetition frequency of the first tactile output.

27. The method of claim 21, wherein, in accordance with a determination that the change in position of the electronic device is less than a predetermined threshold, the first value of the characteristic and the second value of the characteristic are the same.

28. The method of claim 21, wherein the characteristic is selected from the group consisting of oscillation frequency, pulse repetition frequency, pulse duration, pulse pattern, amplitude, and a number of pulses.

29. The method of claim 21, wherein outputting the first tactile output is further in accordance with a determination that a set of start criteria is met.

30. The method of claim 29, wherein the set of start criteria includes a criterion that is met when the distance between the electronic device and the point of reference is less than a first threshold distance value.

31. The method of claim 30, further comprising:
while outputting the first tactile output, determining whether a current position of the electronic device relative to the point of reference meets a set of stop criteria, wherein the set of stop criteria includes a criterion that is met when the current distance between the electronic device and the point of reference is less than a second threshold distance value, wherein the second threshold distance value is less than the first threshold distance value; and
in accordance with a determination that the current position of the electronic device relative to the point of reference meets the set of stop criteria, ceasing to output the first tactile output.

32. The method of claim 29, wherein the set of start criteria includes a criterion that is met when the distance between the electronic device and the point of reference is greater than a first threshold distance value.

33. The method of claim 32, further comprising:
while outputting the first tactile output, determining whether the current position of the electronic device relative to the point of reference meets a set of stop criteria, wherein the set of stop criteria includes a criterion that is met when the current distance between the electronic device and the point of reference is greater than a second threshold distance value, wherein the second threshold distance value is greater than the first threshold distance value; and
in accordance with a determination that the current position of the electronic device relative to the point of reference meets the set of stop criteria, ceasing to output the first tactile output.

34. The method of claim 29, further comprising:
while outputting the first tactile output, determining whether a second set of stop criteria is met, wherein the second set of stop criteria includes a criterion that is met when:
  the difference between the current position relative to the point of reference and a previous position relative to the point of reference is less than a predetermined threshold, and
  the amount of time between a current time and a time associated with the previous position is greater than a predetermined amount of time; and
in accordance with a determination that the second set of stop criteria is met, ceasing to output the first tactile output.

35. The method of claim 21, wherein the point of reference is a fixed geographic location.

36. The method of claim 21, further comprising:
receiving data about a position of a remote device, wherein the point of reference is the position of the remote device.

37. The method of claim 36, wherein the point of reference is associated with a contact, and wherein the first tactile output or the second tactile output includes a second characteristic and is further generated based on a value of the second characteristic that is selected in accordance with the contact.

38. The method of claim 36, wherein the point of reference is a first point of reference associated with a first contact in a group, and wherein the method further comprises:
determining a third position of the electronic device relative to a second point of reference associated with a second contact in the group; and
after determining the third position of the electronic device relative to the second point of reference:
in accordance with a determination that the first point of reference is greater than a first threshold distance from the electronic device, outputting, via the one or more tactile output devices, a third tactile output, wherein the third tactile output is generated based on a value of a second characteristic that is selected in accordance with the group; and
in accordance with a determination that the first point of reference is less than the first threshold distance from the electronic device, suppressing the third tactile output.

39. The method of claim 38, wherein the third tactile output is suppressed only if a tactile output associated with the second contact has been previously output.

40. The method of claim 38, wherein outputting the third tactile output is further in accordance with a determination that the second point of reference is less than a second threshold distance from the electronic device and a previous distance between the second point of reference and the electronic device was greater than the second threshold distance.

41. The method of claim 38, wherein outputting the third tactile output is further in accordance with a determination that the second point of reference is greater than a second threshold distance from the electronic device and a previous distance between the second point of reference and the electronic device was less than the second threshold distance.

42. The electronic device of claim 22, wherein the first value of the characteristic is proportional to a distance between the first position of the electronic device and the point of reference, and the second value of the characteristic is proportional to a distance between the second position of the electronic device and the point of reference.

43. The electronic device of claim 22, wherein the first value of the characteristic is inversely proportional to a distance between the first position of the electronic device and the point of reference, and the second value of the characteristic is inversely proportional to a distance between the second position of the electronic device and the point of reference.

44. The electronic device of claim 22, wherein the one or more programs further include instructions for:
determining a difference between the first position of the electronic device relative to the point of reference and the second position of the electronic device relative to the point of reference,
wherein the second value of the characteristic is further selected in accordance with the difference between the first position of the electronic device relative to the point of reference and the second position of the electronic device relative to the point of reference.

45. The electronic device of claim 22,
wherein the characteristic is a pulse repetition frequency, and
wherein, in accordance with a determination that the second position of the electronic device is closer to the point of reference than the first position of the electronic device, the second value of the pulse repetition frequency of the second tactile output is selected to be greater than the first value of the pulse repetition frequency of the first tactile output.

46. The electronic device of claim 22, wherein, in accordance with a determination that the change in position of the electronic device is less than a predetermined threshold, the first value of the characteristic and the second value of the characteristic are the same.

47. The electronic device of claim 22, wherein the characteristic is selected from the group consisting of oscillation frequency, pulse repetition frequency, pulse duration, pulse pattern, amplitude, and a number of pulses.

48. The electronic device of claim 22, wherein outputting the first tactile output is further in accordance with a determination that a set of start criteria is met.

49. The electronic device of claim 48, wherein the set of start criteria includes a criterion that is met when the distance between the electronic device and the point of reference is less than a first threshold distance value.

50. The electronic device of claim 49, wherein the one or more programs further include instructions for:
while outputting the first tactile output, determining whether a current position of the electronic device relative to the point of reference meets a set of stop criteria, wherein the set of stop criteria includes a criterion that is met when the current distance between the electronic device and the point of reference is less than a second threshold distance value, wherein the second threshold distance value is less than the first threshold distance value; and
in accordance with a determination that the current position of the electronic device relative to the point of reference meets the set of stop criteria, ceasing to output the first tactile output.

51. The electronic device of claim 48, wherein the set of start criteria includes a criterion that is met when the distance between the electronic device and the point of reference is greater than a first threshold distance value.

52. The electronic device of claim 51, wherein the one or more programs further include instructions for:
while outputting the first tactile output, determining whether the current position of the electronic device relative to the point of reference meets a set of stop criteria, wherein the set of stop criteria includes a criterion that is met when the current distance between the electronic device and the point of reference is greater than a second threshold distance value, wherein the second threshold distance value is greater than the first threshold distance value; and
in accordance with a determination that the current position of the electronic device relative to the point of reference meets the set of stop criteria, ceasing to output the first tactile output.

53. The electronic device of claim 48, wherein the one or more programs further include instructions for:

while outputting the first tactile output, determining whether a second set of stop criteria is met, wherein the second set of stop criteria includes a criterion that is met when:
  the difference between the current position relative to the point of reference and a previous position relative to the point of reference is less than a predetermined threshold, and
  the amount of time between a current time and a time associated with the previous position is greater than a predetermined amount of time; and
in accordance with a determination that the second set of stop criteria is met, ceasing to output the first tactile output.

54. The electronic device of claim 22, wherein the point of reference is a fixed geographic location.

55. The electronic device of claim 22, wherein the one or more programs further include instructions for:
receiving data about a position of a remote device, wherein the point of reference is the position of the remote device.

56. The electronic device of claim 55, wherein the point of reference is associated with a contact, and wherein the first tactile output or the second tactile output includes a second characteristic and is further generated based on a value of the second characteristic that is selected in accordance with the contact.

57. The electronic device of claim 55, wherein the point of reference is a first point of reference associated with a first contact in a group, and wherein the one or more programs further include instructions for:
determining a third position of the electronic device relative to a second point of reference associated with a second contact in the group; and
after determining the third position of the electronic device relative to the second point of reference:
  in accordance with a determination that the first point of reference is greater than a first threshold distance from the electronic device, outputting, via the one or more tactile output devices, a third tactile output, wherein the third tactile output is generated based on a value of a second characteristic that is selected in accordance with the group; and
  in accordance with a determination that the first point of reference is less than the first threshold distance from the electronic device, suppressing the third tactile output.

58. The electronic device of claim 57, wherein the third tactile output is suppressed only if a tactile output associated with the second contact has been previously output.

59. The electronic device of claim 57, wherein outputting the third tactile output is further in accordance with a determination that the second point of reference is less than a second threshold distance from the electronic device and a previous distance between the second point of reference and the electronic device was greater than the second threshold distance.

60. The electronic device of claim 57, wherein outputting the third tactile output is further in accordance with a determination that the second point of reference is greater than a second threshold distance from the electronic device and a previous distance between the second point of reference and the electronic device was less than the second threshold distance.

* * * * *